(12) United States Patent
McLaughlin

(10) Patent No.: US 7,199,069 B2
(45) Date of Patent: Apr. 3, 2007

(54) METHOD FOR DESTRUCTION OF ORGANIC COMPOUNDS BY CO-OXIDATION WITH ACTIVATED CARBON

(76) Inventor: Hugh Stanley McLaughlin, 151 Hill Rd., Groton, MA (US) 01450-1609

( * ) Notice: Subject to any disclaimer, the term of this patent is extended or adjusted under 35 U.S.C. 154(b) by 86 days.

(21) Appl. No.: 11/186,344

(22) Filed: Jul. 21, 2005

(65) Prior Publication Data

US 2005/0255023 A1 Nov. 17, 2005

Related U.S. Application Data

(62) Division of application No. 10/425,327, filed on Apr. 29, 2003, now Pat. No. 6,982,068.

(60) Provisional application No. 60/392,659, filed on Jun. 28, 2002, provisional application No. 60/376,914, filed on May 1, 2002.

(51) Int. Cl.
*B01J 20/34* (2006.01)
(52) U.S. Cl. ............................ 502/38; 502/39; 502/40; 502/41; 502/51; 502/42
(58) Field of Classification Search ............ 423/245.1, 423/245.3; 502/38, 39, 40, 41, 42, 51; 210/694
See application file for complete search history.

(56) References Cited

U.S. PATENT DOCUMENTS

| 2,933,454 | A | | 4/1960 | Repik et al. |
| 3,153,633 | A | | 10/1964 | Von Dreusche, Jr. |
| 3,442,798 | A | | 5/1969 | Zimmermann et al. |
| 4,030,876 | A | | 6/1977 | Akae et al. |
| 4,036,750 | A | * | 7/1977 | Jaros et al. ............ 210/669 |
| 4,053,396 | A | * | 10/1977 | Trense et al. ............ 210/618 |
| 4,147,624 | A | * | 4/1979 | Modell ............ 210/673 |
| 4,957,721 | A | | 9/1990 | Lonsinger et al. |
| 5,368,738 | A | | 11/1994 | Dussert et al. |
| 5,368,739 | A | | 11/1994 | Dussert et al. |
| 5,436,211 | A | * | 7/1995 | Erbel ............ 502/56 |
| 5,453,259 | A | * | 9/1995 | D'Souza ............ 423/245.1 |
| 5,496,395 | A | * | 3/1996 | Yamazaki ............ 96/123 |
| 6,773,491 | B1 | * | 8/2004 | Bohl ............ 96/130 |

OTHER PUBLICATIONS

Loven, A.W., "Perspectives on Carbon Regeneration", Chemical Engineering Progress, vol. 69, No. 11, pp. 56-62, 1973.
Matatov-Meytal et al., "Optimal Temperatures for Catalytic Regeneration of Activated Carbon", Carbon, vol. 35, No. 10-11, pp. 1527-1531, 1997.
T.C. Brown et al., "Oxygen Chemisorption on Carbon", Department of Chemical Engineering, University of Sydney, N.S.W. 2006, Australia, pp. 1199-1206.

* cited by examiner

*Primary Examiner*—Ngoc-Yen Nguyen
(74) *Attorney, Agent, or Firm*—Brian M. Dingman; Miriek, O'Connell, DeMallie & Lougee, LLP

(57) ABSTRACT

A method for oxidizing carbon adsorbable organic compounds in a controlled manner within a bed of activated carbon. The bed of activated carbon is exposed to a source of molecular oxygen, such as air, and is controlled within a temperature range whereby the molecular oxygen is slowly oxidizing the activated carbon. Under this controlled set of conditions, the activated carbon will oxidize organic compounds present within the bed of activated carbon. This technique has widespread versatility for the controlled destruction of organic vapors and liquids by activated carbon and applications for the regeneration of spent activated carbons containing previously adsorbed organic compounds.

18 Claims, 21 Drawing Sheets

Reactor

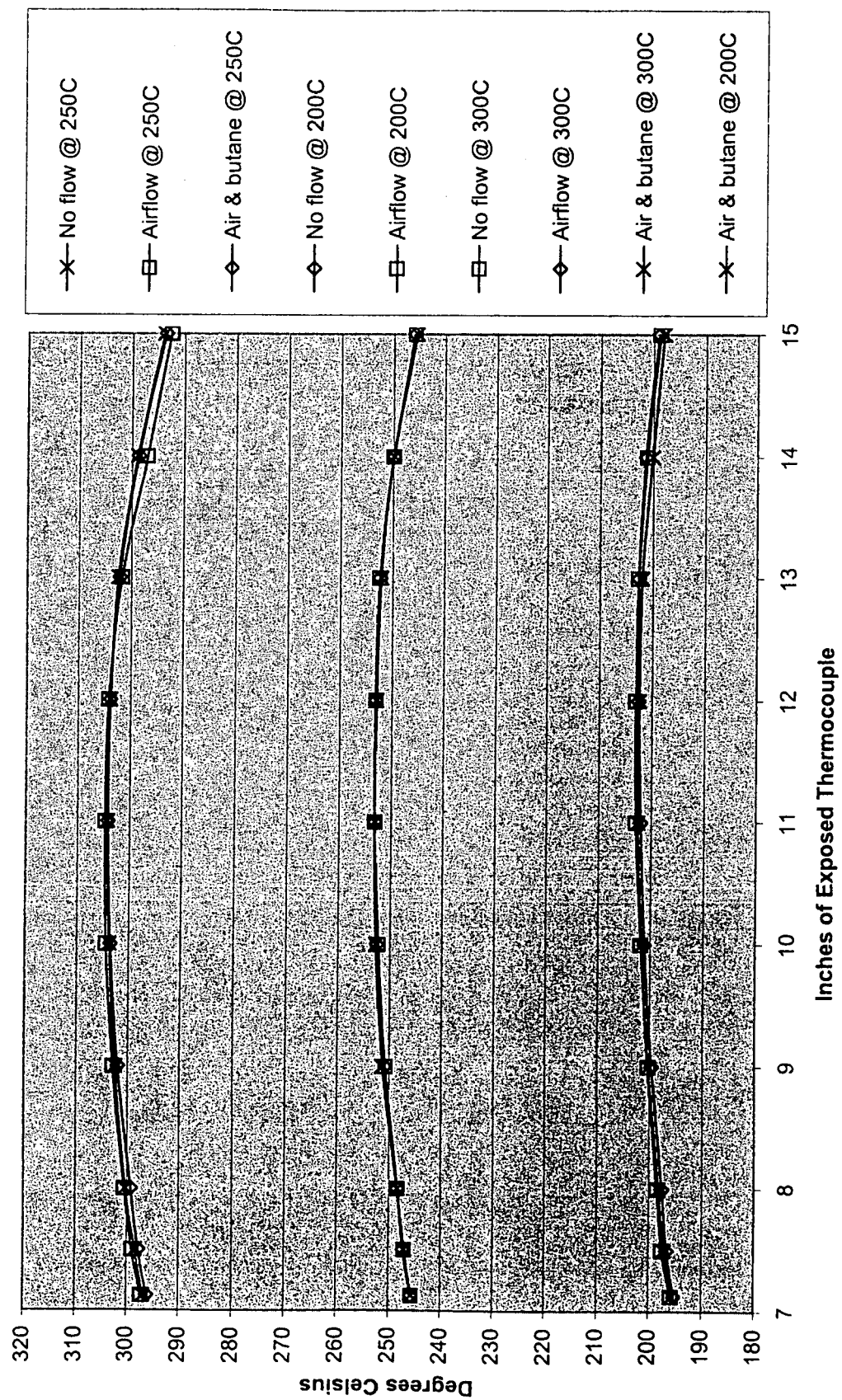

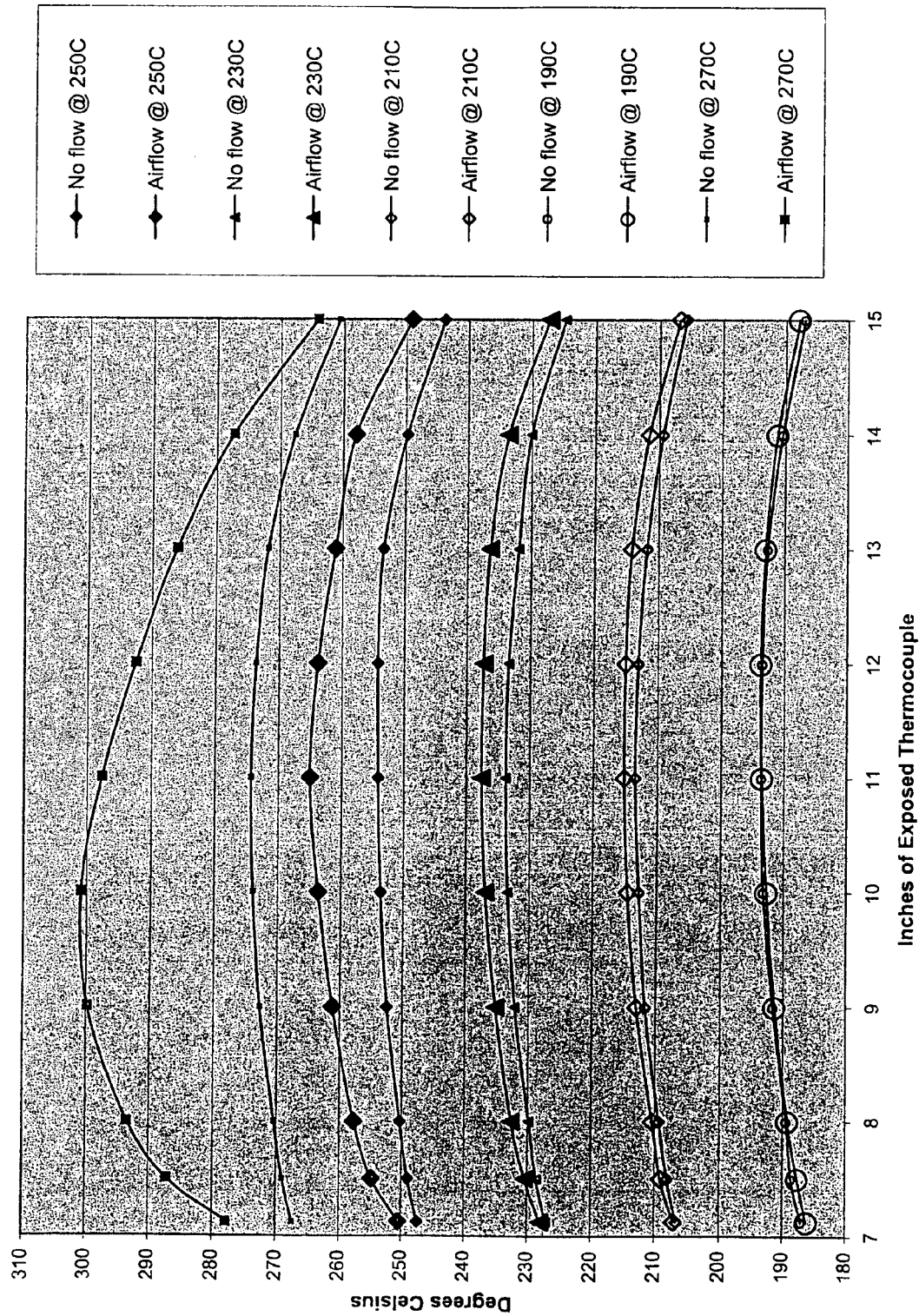
Figure 3: Activated Carbon Temperature Profiles with & w/o Airflow

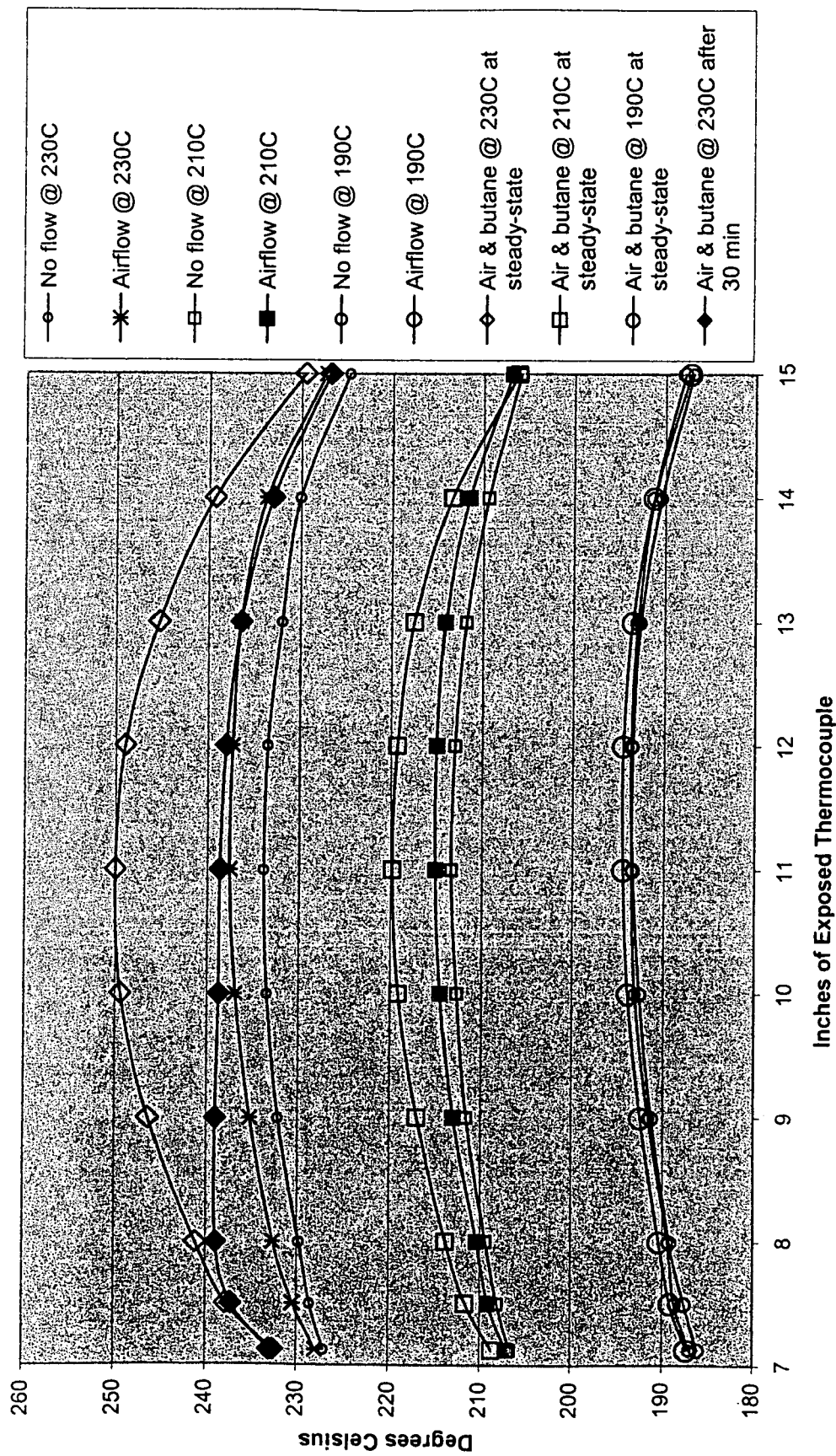
Figure 4: Activated Carbon Temperature Profiles w/o Air, with Air and with Air & Butane

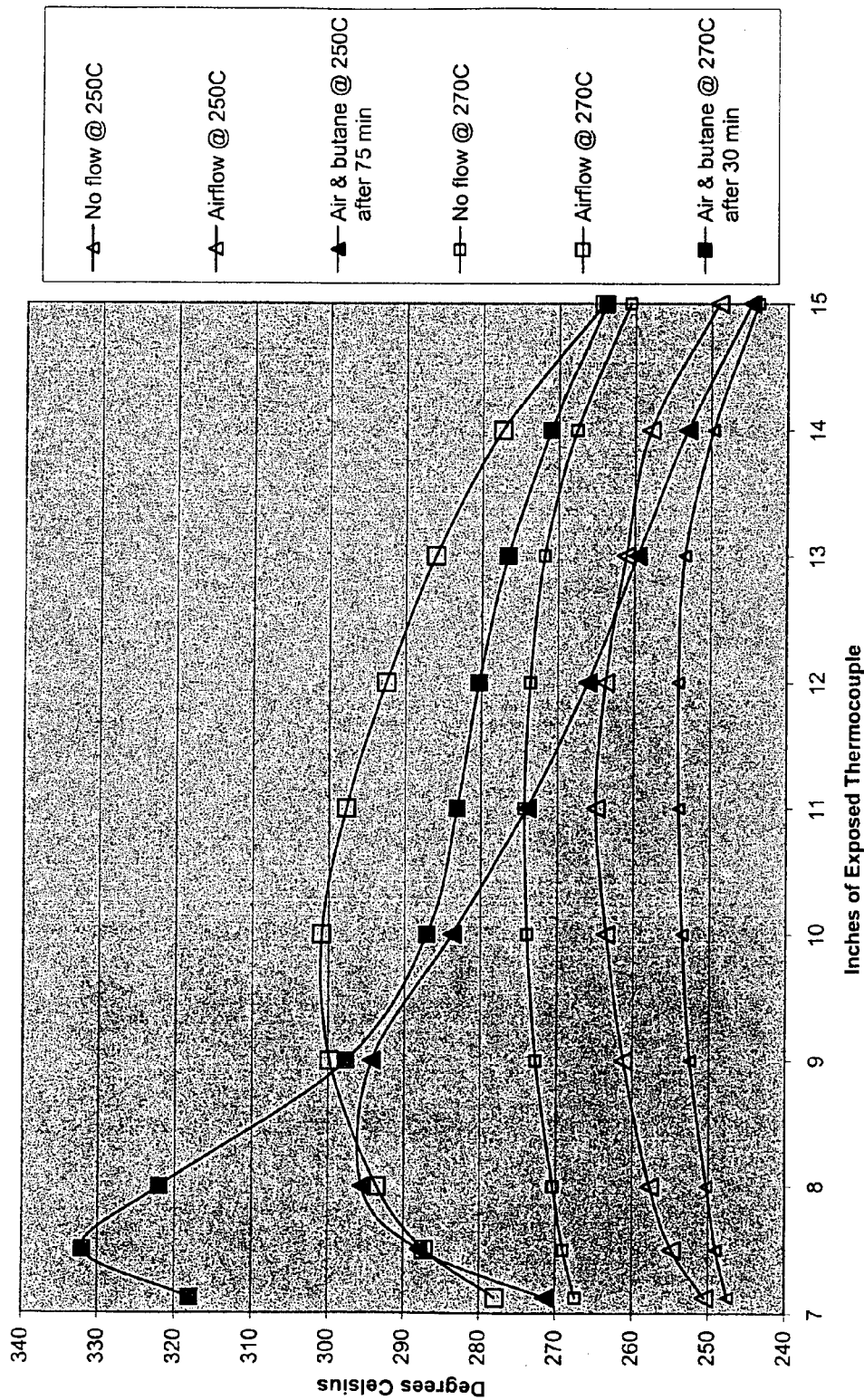

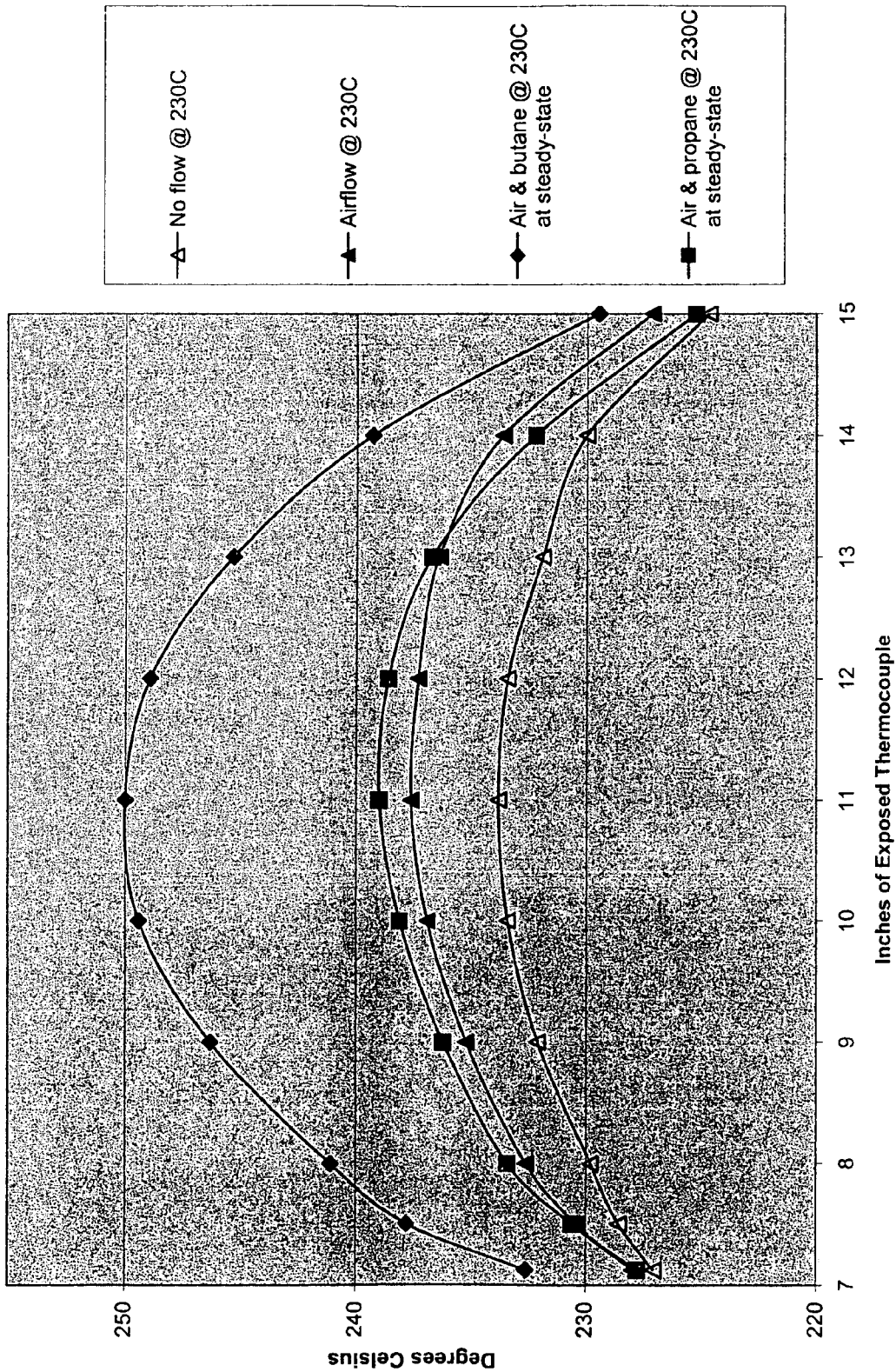
Figure 6: Activated Carbon Temperature Profiles with Butane verus Propane

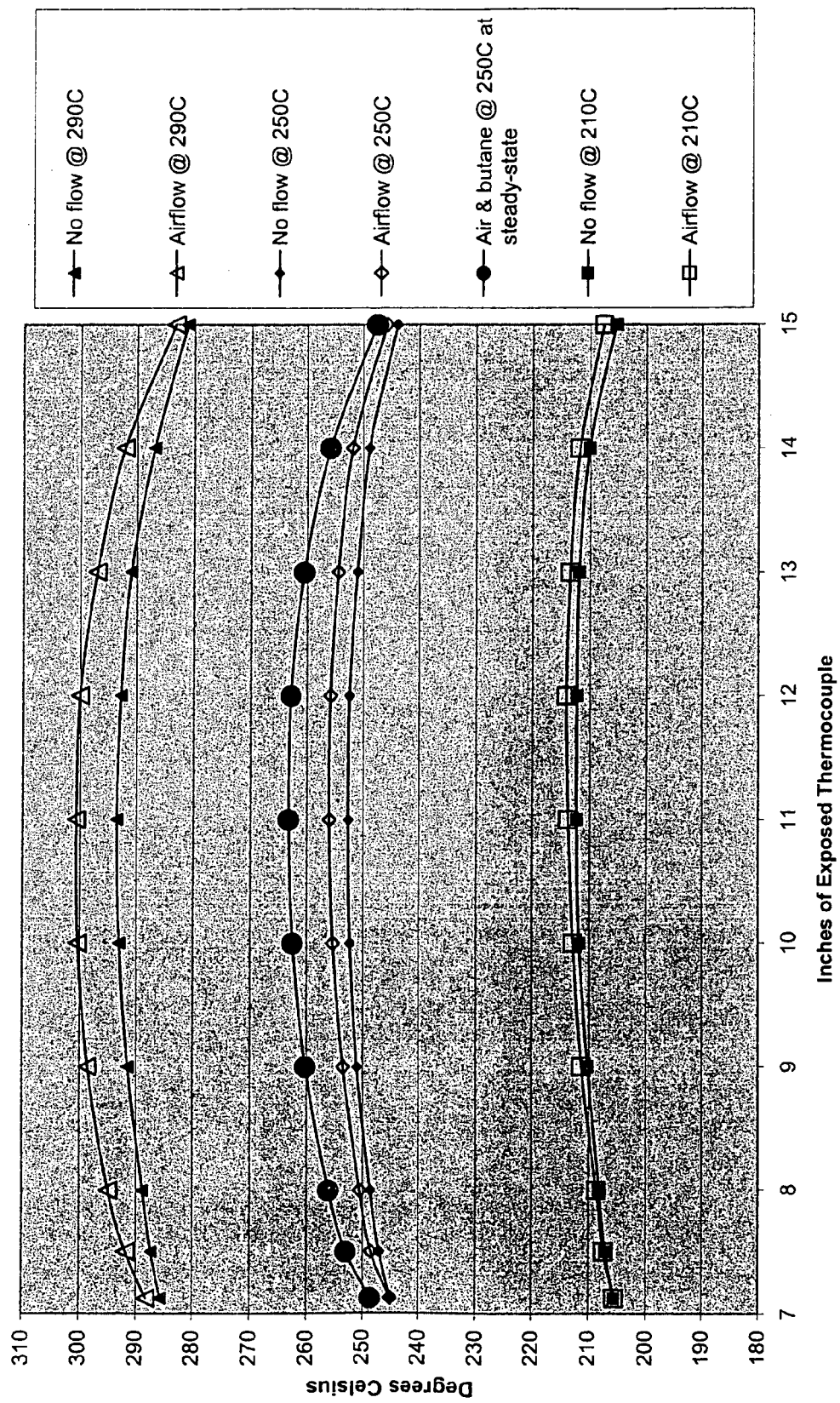

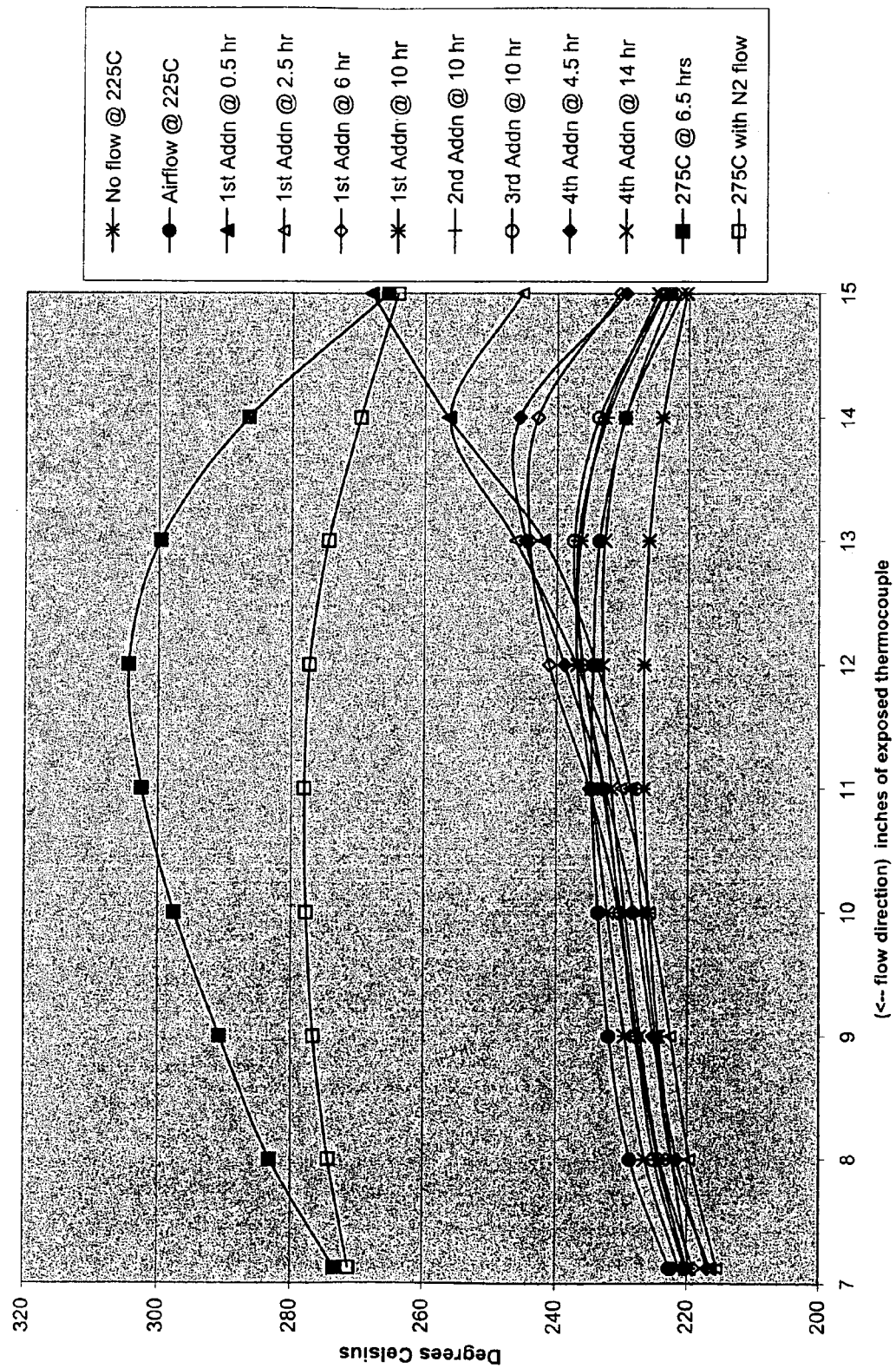
FIGURE 8: Temperature profiles during destruction of Mineral Oil

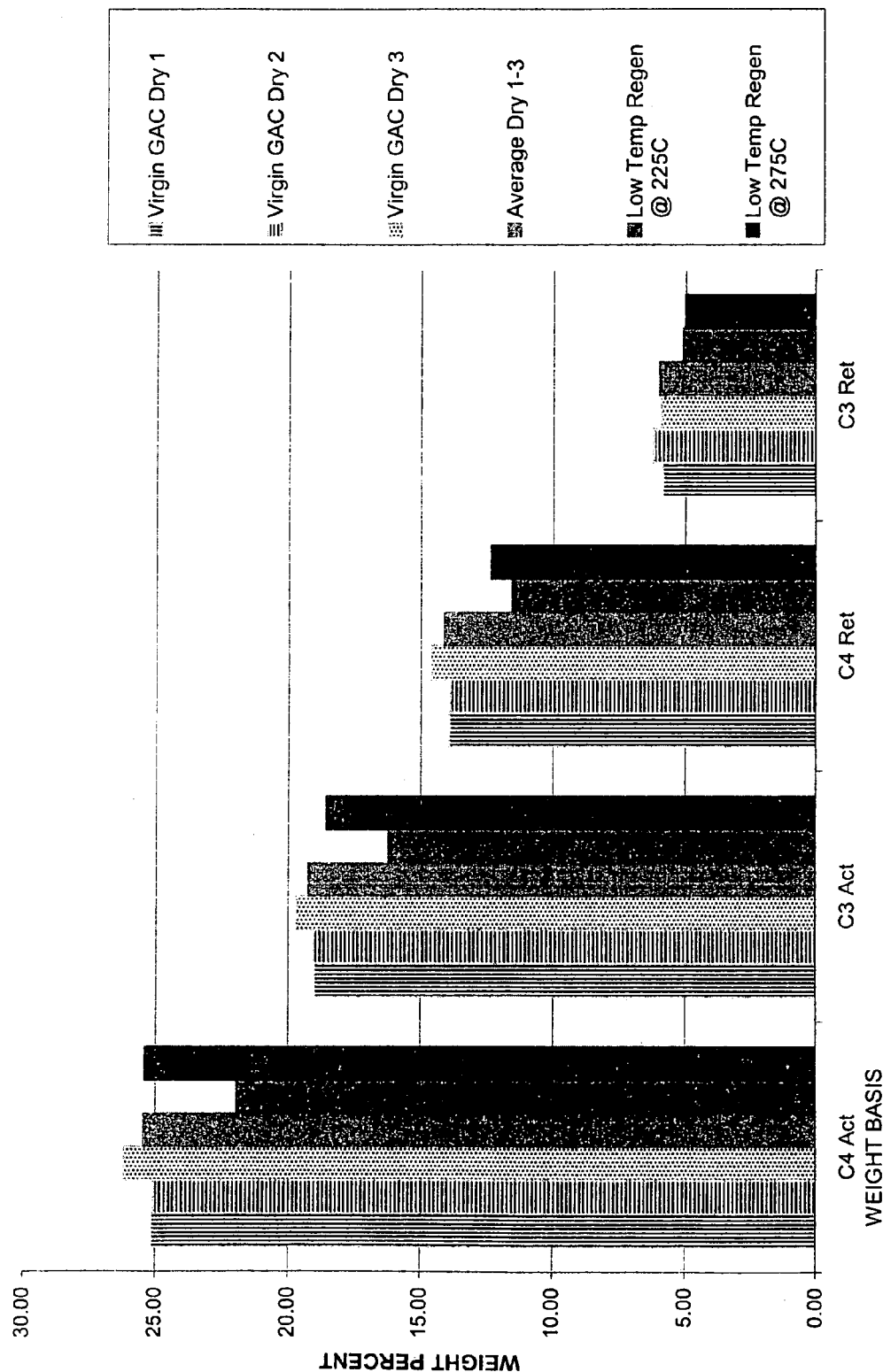
FIGURE 9: Carbon adsorption properties during destruction of Mineral Oil

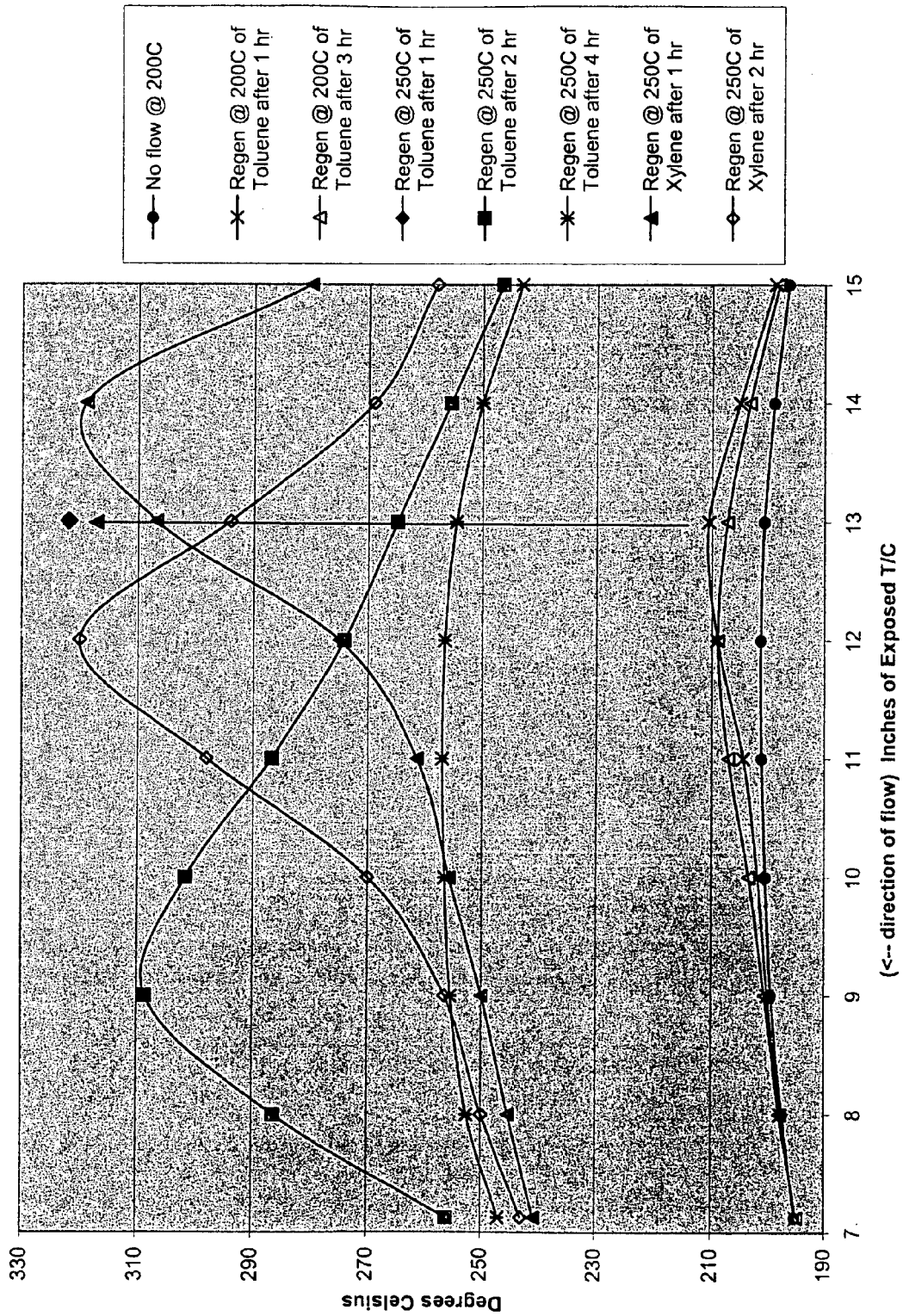
Figure 10: Temperature profiles during destruction of Toluene then Xylene

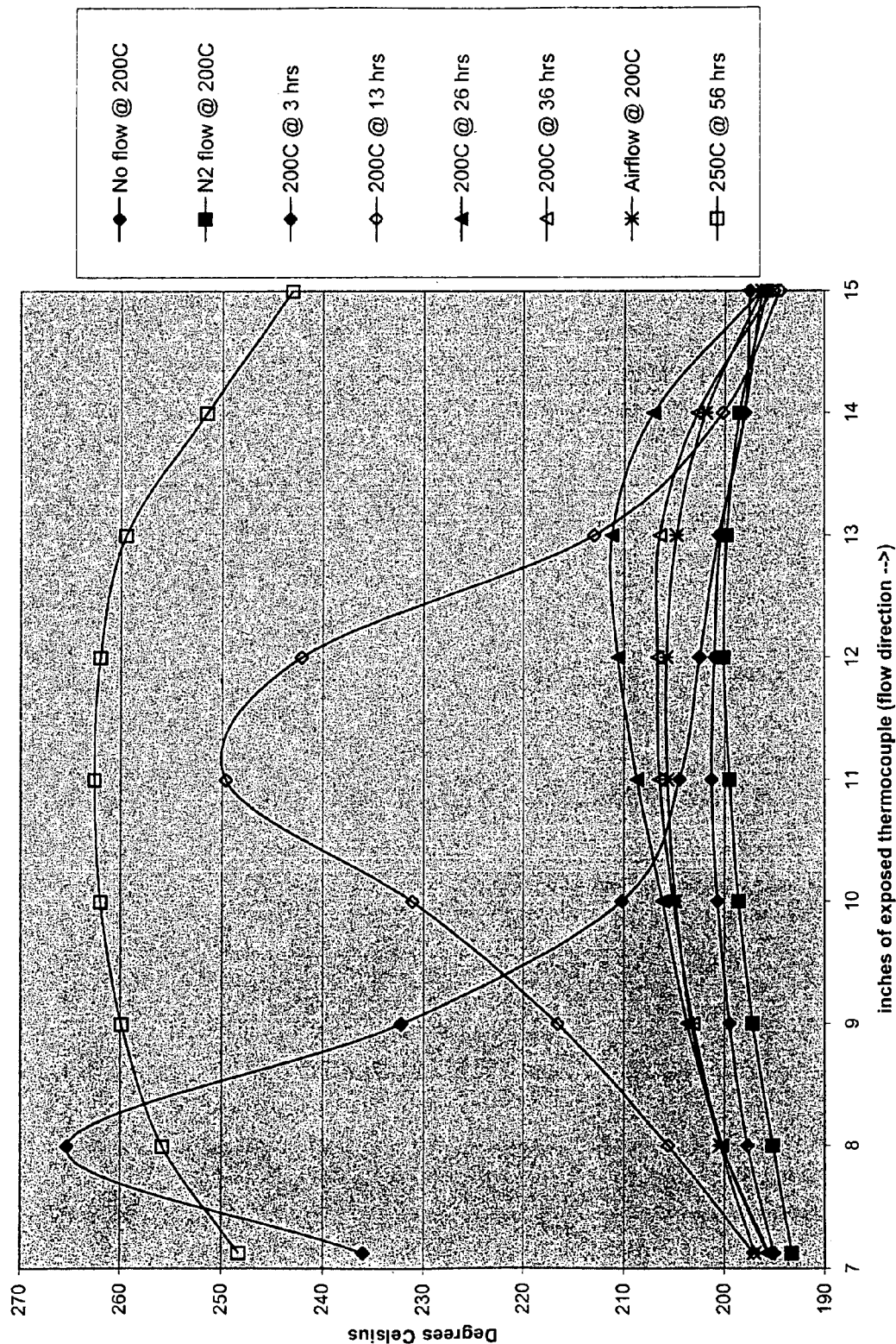

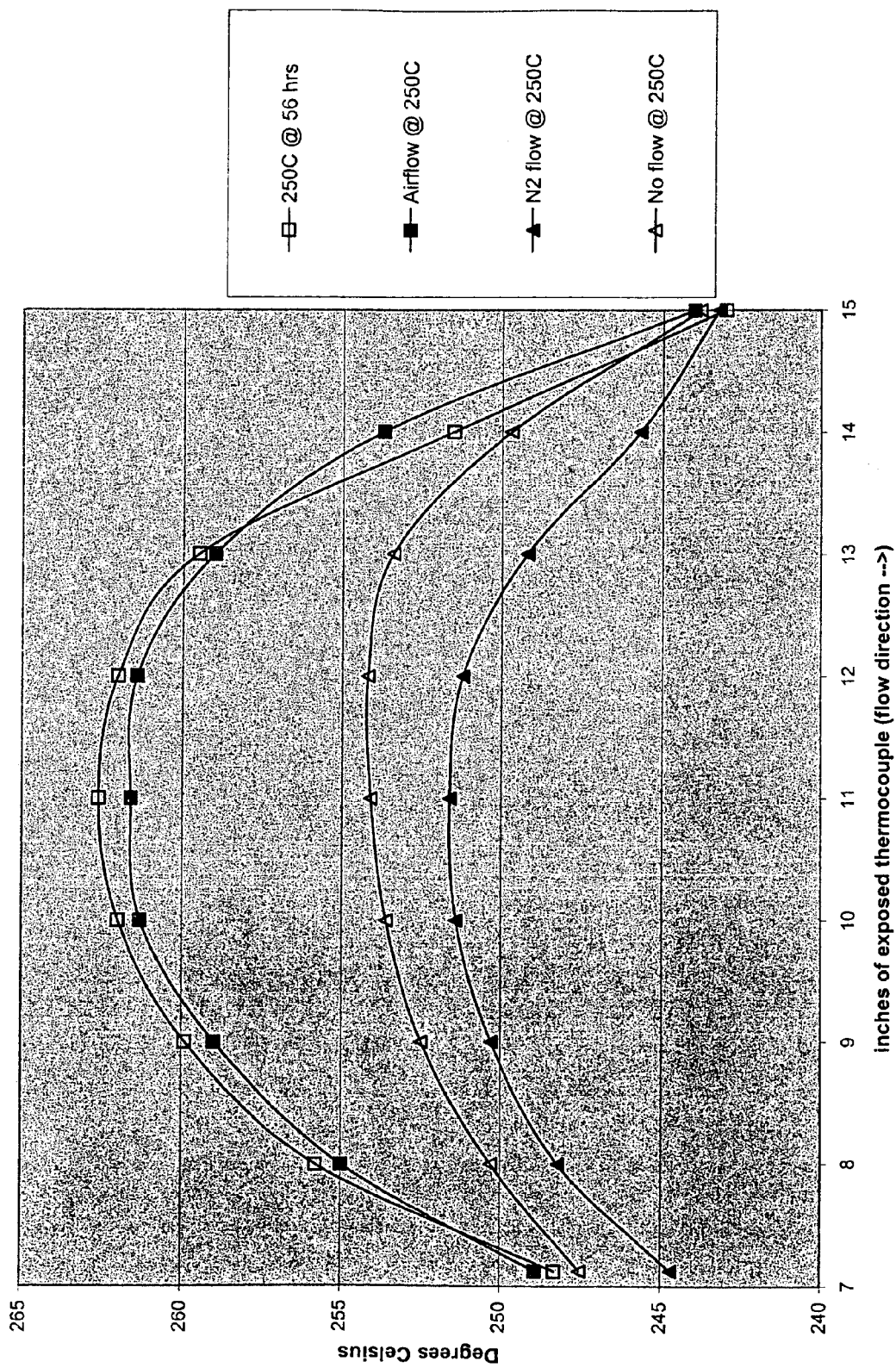
FIGURE 12: Temperature profiles at end of Low Temp Regeneration at 250C

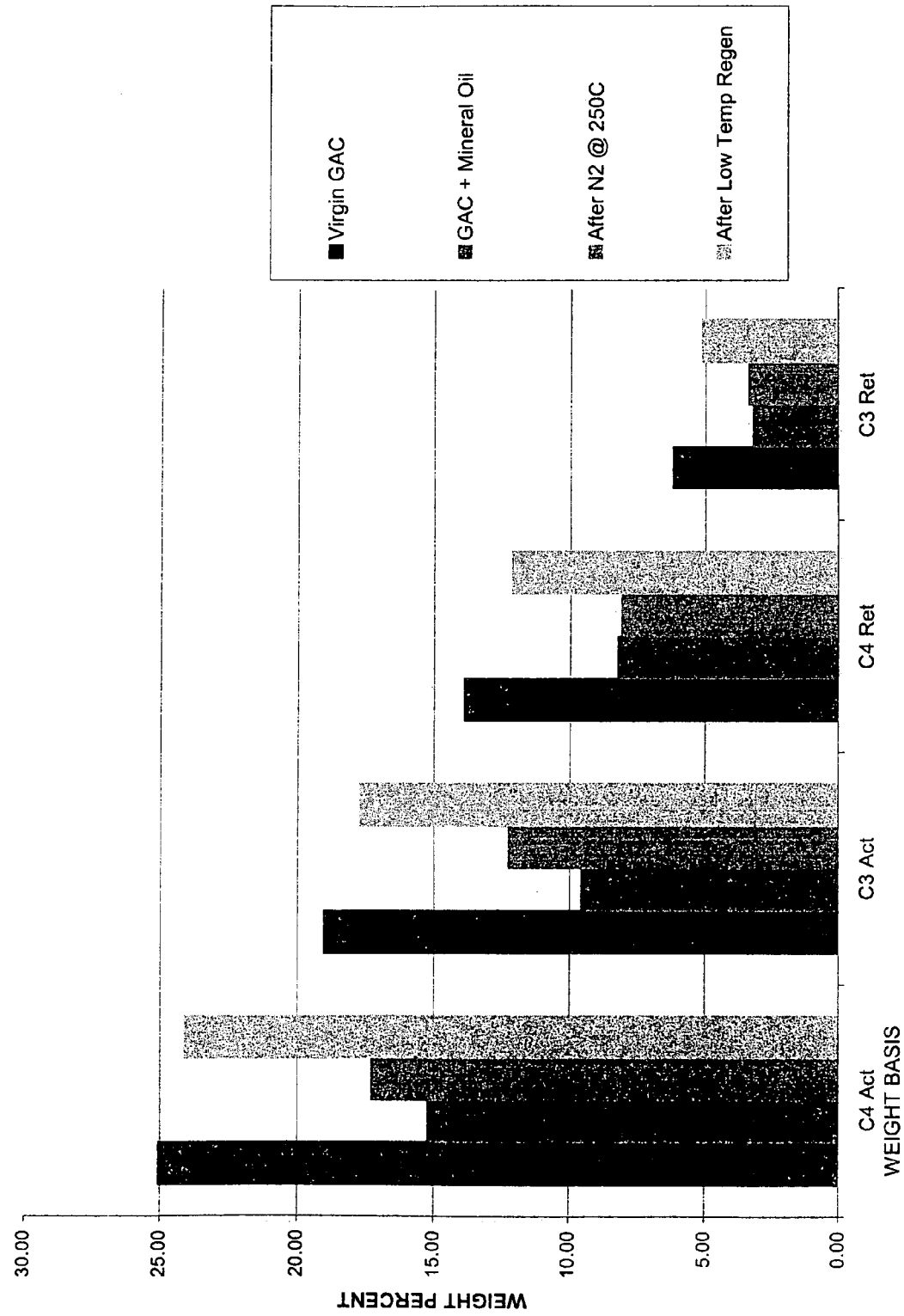

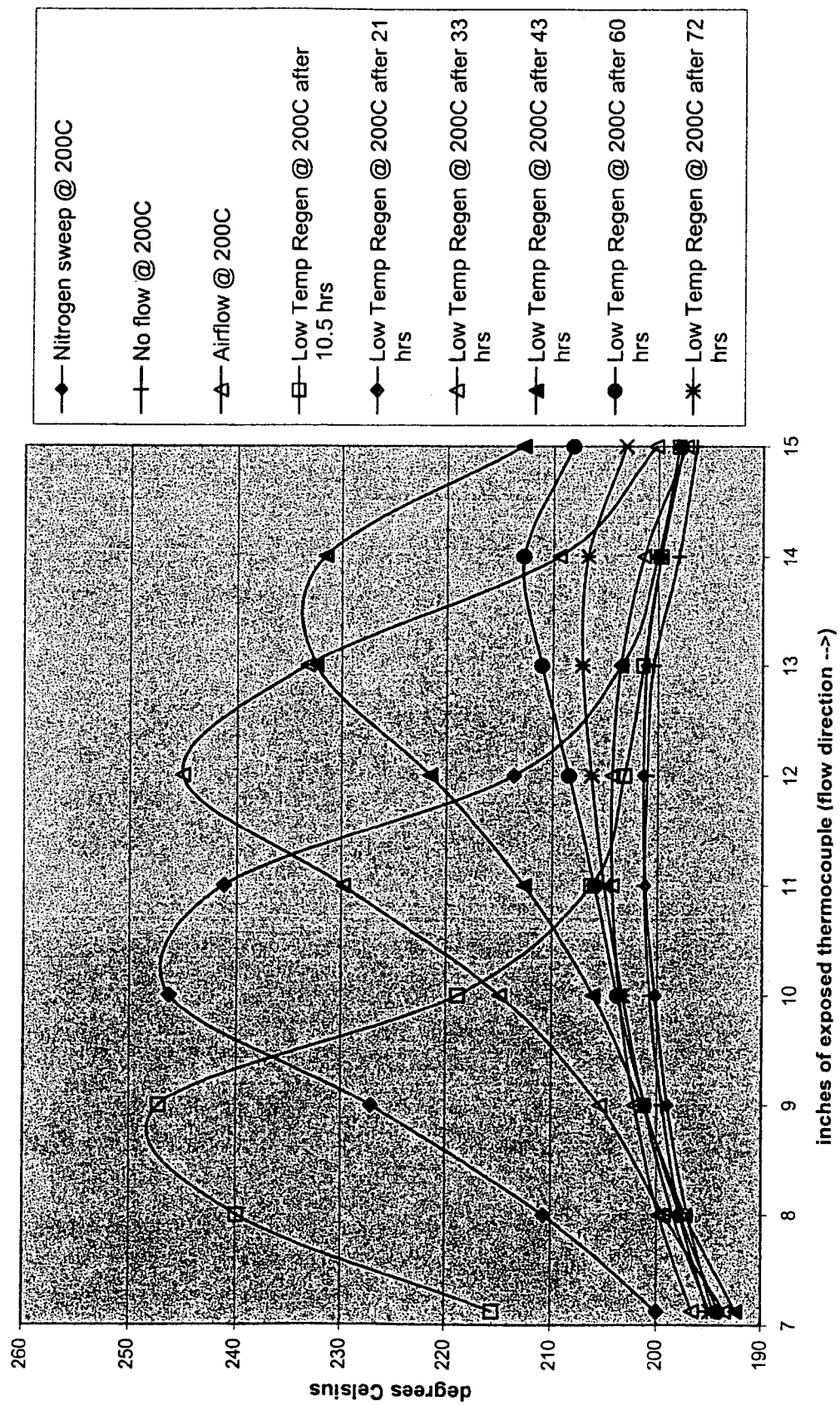
FIGURE 14: Temperature profiles during regeneration of Synthetic Spent Activated Carbon

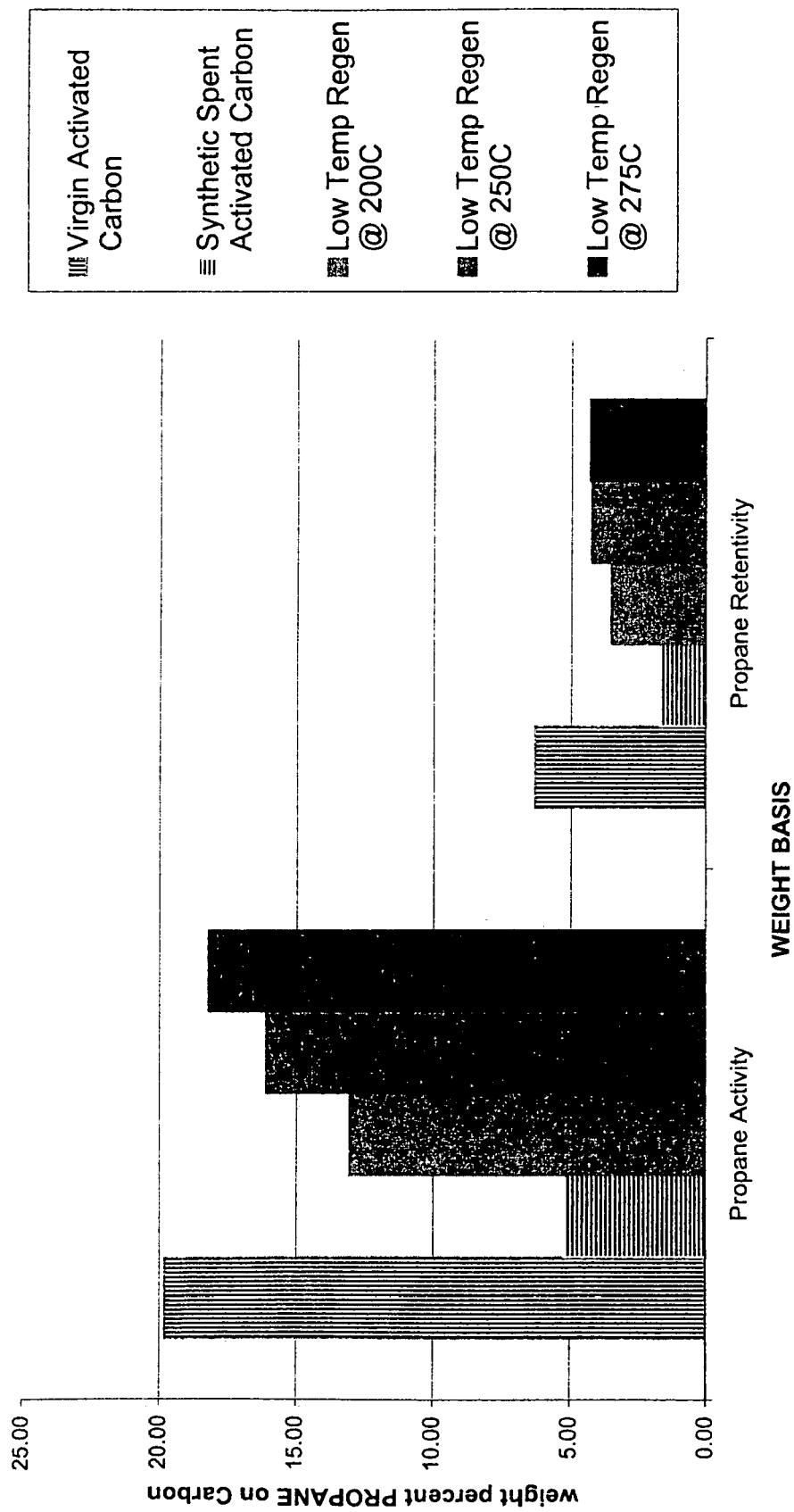
FIGURE 15: Synthetic Spent Activated Carbon adsorption characteristics

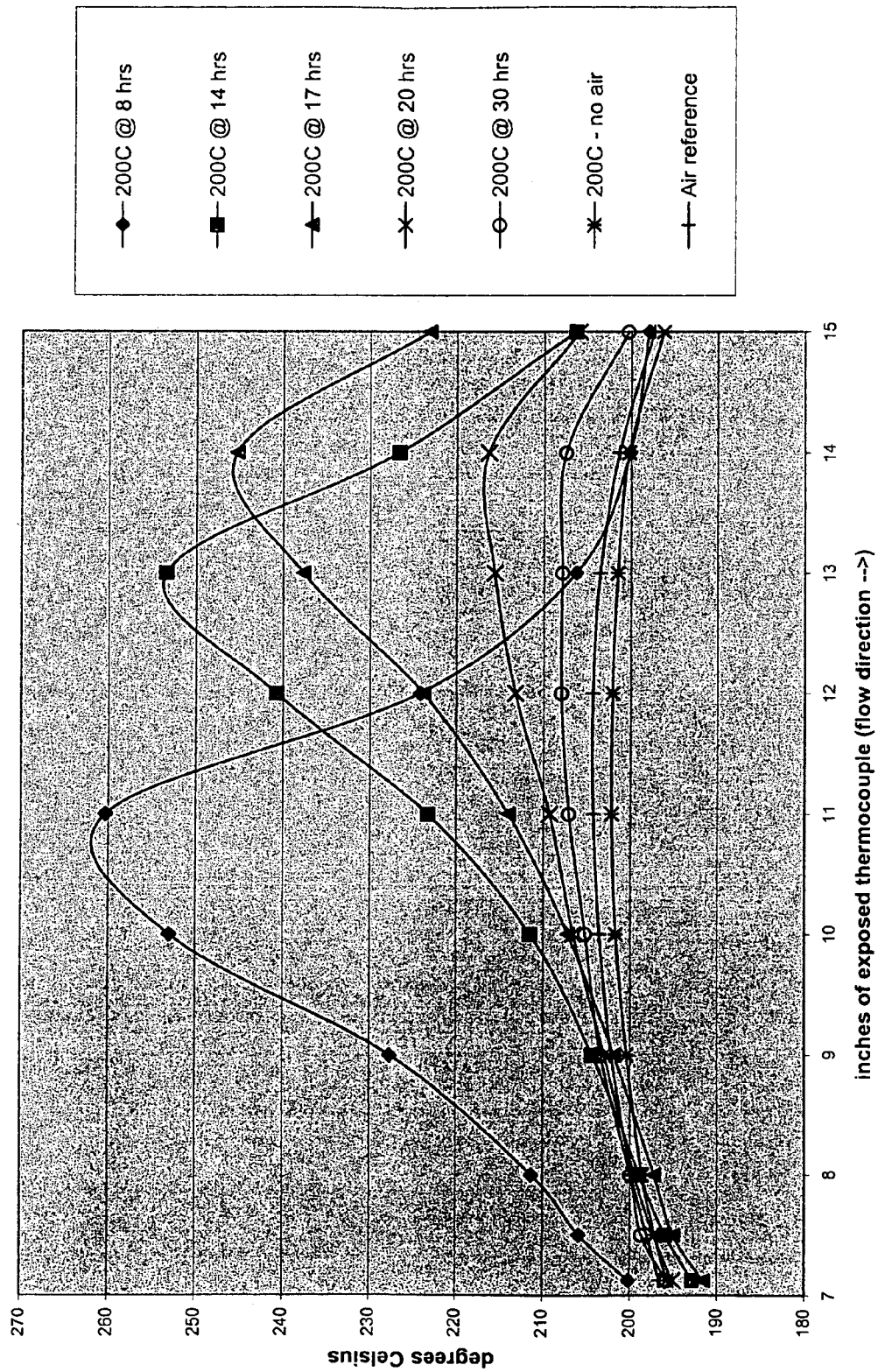
FIGURE 16: Temperature profiles during regeneration of Commercial Spent Activated Carbon

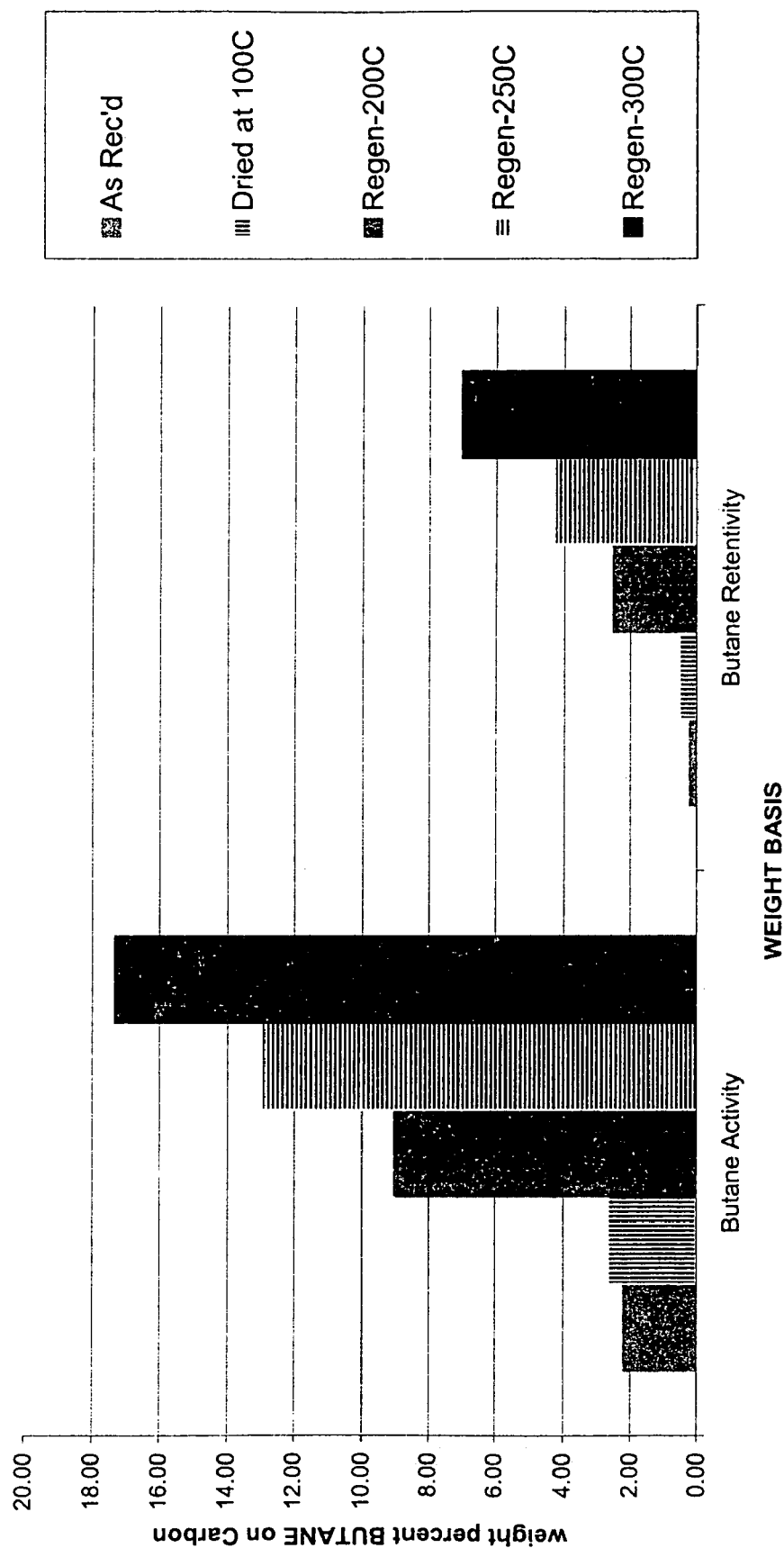
FIGURE 17: Commercial Spent Activated Carbon adsorption characteristics

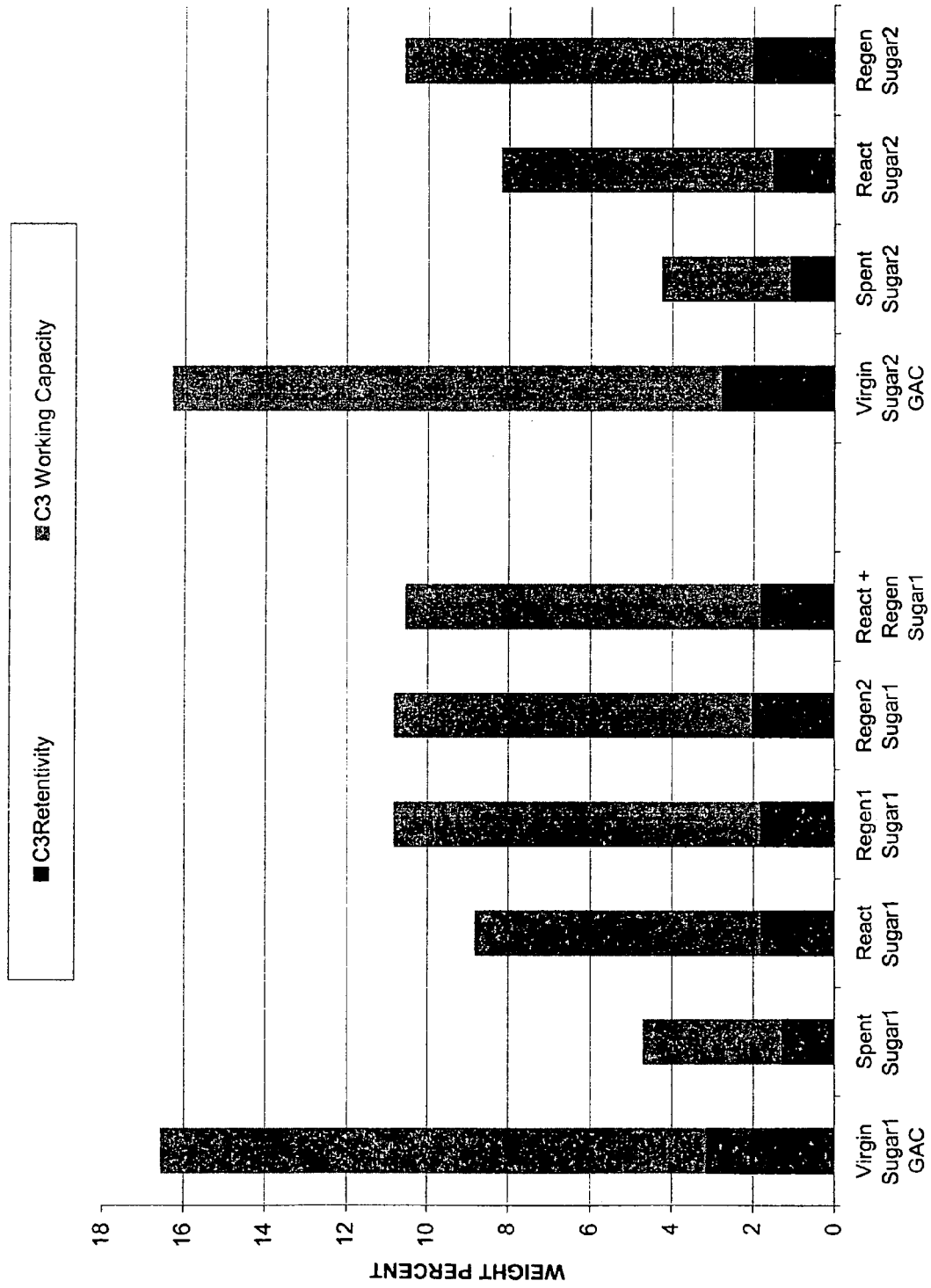

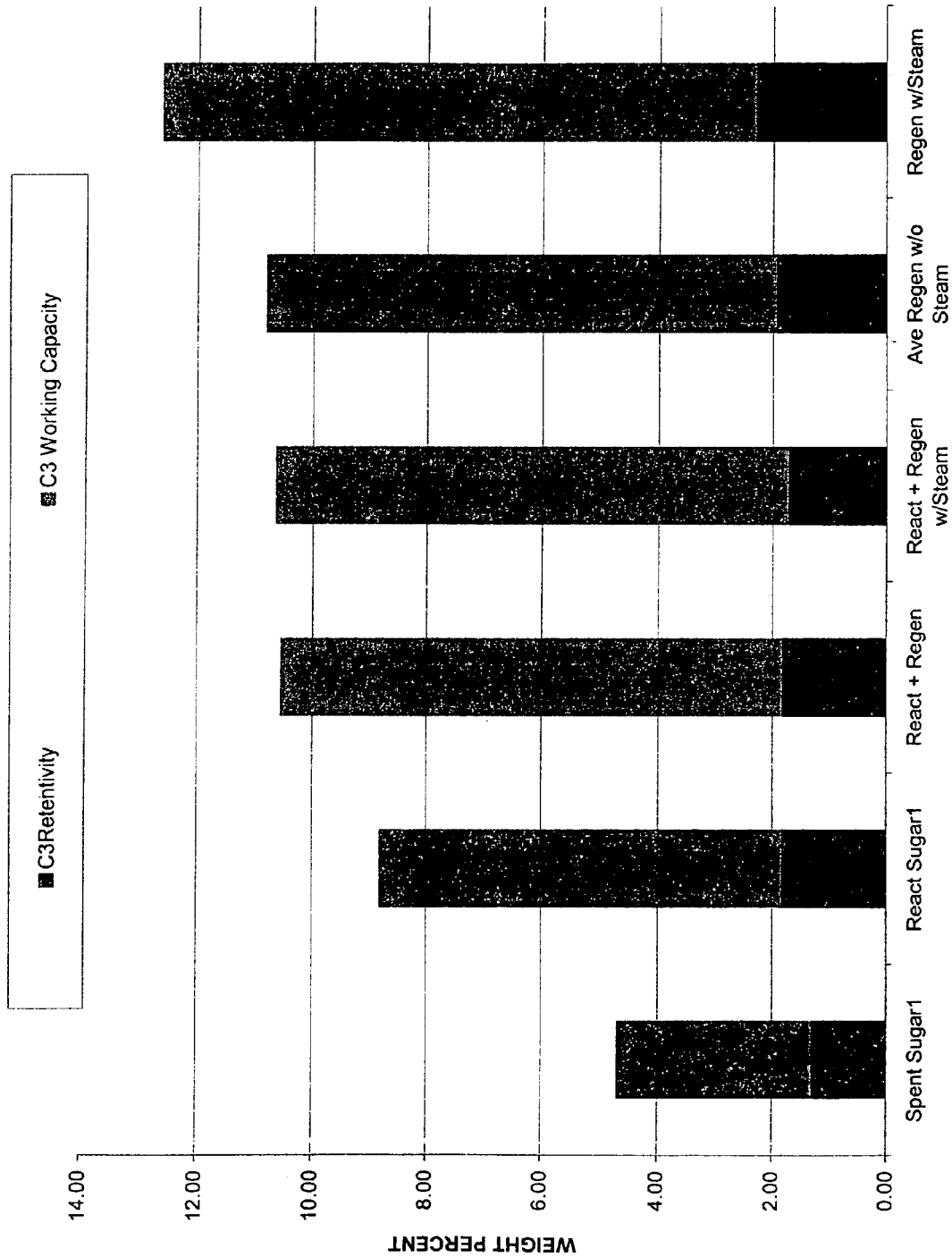
FIGURE 19: Impact of Supplemental Steam on Sugar1 GAC Regeneration

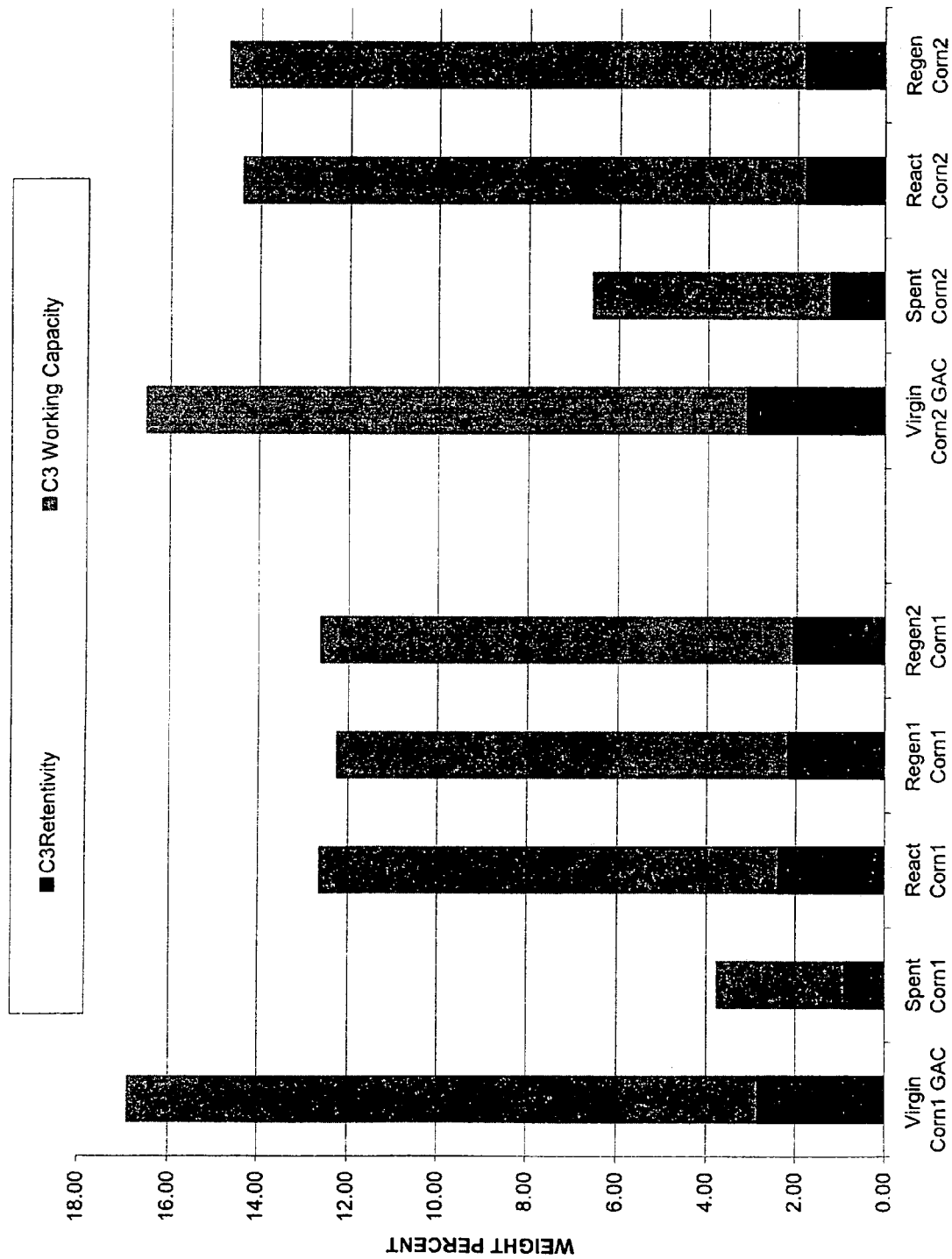
FIGURE 20: Low Temp Regeneration of Corn Sweetener Activated Carbons

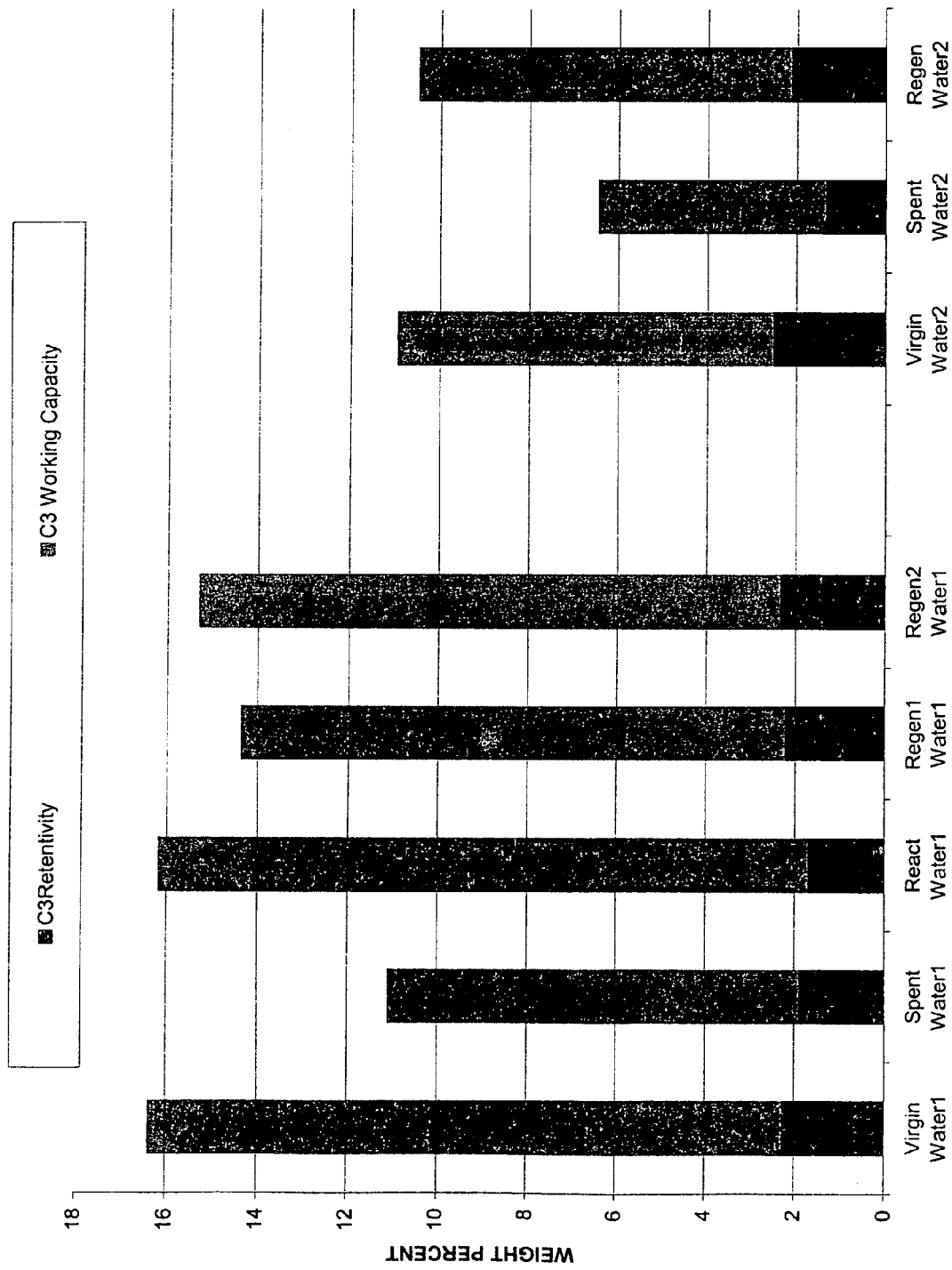
FIGURE 21: Low Temp Regeneration of Potable Water Supply Activated Carbon

METHOD FOR DESTRUCTION OF ORGANIC COMPOUNDS BY CO-OXIDATION WITH ACTIVATED CARBON

CROSS REFERENCE TO RELATED APPLICATIONS

This application claims priority of Provisional application Ser. No. 60/376,914, filed on May 1, 2002, and Provisional application Ser. No. 60/392,659, filed on Jun. 28, 2002, and is a divisional of application Ser. No. 10/425,327, filed on Apr. 29, 2003, now U.S. Pat. No. 6,982,068.

FIELD OF THE INVENTION

This invention relates to applications for activated carbon, specifically to the utilization of activated carbon to facilitate and control oxidation reactions involving organic compounds.

BACKGROUND OF THE INVENTION

Activated carbon is a versatile and inexpensive adsorbent produced from a variety of abundant carbon-containing raw materials, such as coal, wood and coconut shells. The unique properties of activated carbon relate to the carbon-based backbone, which is highly porous over a broad range of pore sizes from visible cracks and crevices to cracks and crevices of molecular dimensions. Intermolecular attractions in these smallest pores result in adsorption forces, which cause condensation of adsorbate gases or precipitation of adsorbates from solution into these molecular scale pores.

Activated carbon, once manufactured, is generally used to adsorb organic compounds from liquid and vapors streams. Activated carbon is also used to a much lesser extent as a catalyst support, whereby the activated carbon backbone serves to stabilize and immobilize a catalytic material. The catalytic material is typically a metal compound and the subsequent "catalyst" is usually used under reducing conditions, in the absence of significant molecular oxygen, to catalyze additions of hydrogen to organic compounds. It is not common industrial practice to utilize activated carbon as a catalyst support for reactions involving oxygen or a source of molecular oxygen such as air, due to concerns that the carbon backbone will enter into combustion reactions and destroy the catalyst and associated equipment. The literature includes one process whereby hydrocarbons are adsorbed on "catalyst-impregnated activated carbon at ambient temperature, and then raising the temperature high enough to oxidize the adsorbate but not the carbon. Such a scheme requires a catalyst-substrate system in which the oxidation of the adsorbate and that of the carbon occur at significantly different temperatures." ("Catalytic Oxidation of Adsorbed Hydrocarbons," J. Nwankwo and A. Turk, Annals NY Acad. Sci. Vol. 237, pp 397–408 (1974)).

Activated carbon also serves as the support for many impregnating agents that chemically react with vapor phase contaminants. The most common example is impregnation with a caustic substance, such as sodium or potassium hydroxide, for the purposes of increasing capacity for the treatment of hydrochloric and sulfuric acid vapors. In this manner, the capacity for neutralizing the acid gases is greatly increased over unmodified activated carbon alone, which possesses relatively little native buffering capacity. Other impregnating agents are specific catalysts introduced into gas mask carbons, which catalyze the decomposition of specific chemical agents, such as phosgene.

Unmodified activated carbon does show reactivity towards molecular oxygen, including reactions in wetted carbon at ambient temperatures. This wetted carbon has been described for use in pH control in water treatment applications (U.S. Pat. No. 5,368,739). Another method of oxidizing activated carbon for pH control in water treatment applications involves conditioning virgin activated carbon in air at temperatures of 300 C to 700 C for between 5 minutes to 3 hours (U.S. Pat. No. 5,368,738). Activated carbon is also known to promote a few oxidation reactions under ambient conditions, such as the adsorption of hydrogen sulfide, followed by the oxidation to sulfuric acid in the presence of water vapor. There are also commercially available activated carbons specifically manufactured to have intrinsic catalytic properties to catalyze free radical reactions, such as the decomposition of hydrogen peroxide.

While activated carbon has shown a variety of diverse applications, the predominant application is adsorption for the removal of chemical species from waters and wastewaters, as well as the removal of chemicals from vapor streams, most commonly air. It is in these applications, where the activated carbon is being utilized without modification after activation of the carbonaceous raw material, that the novelty of the current invention resides. Specifically, this invention provides a new option for removing adsorbed oxidizable organic compounds from the internal structure of the activated carbon. This option can either be implemented as the activated carbon continues to adsorb additional compounds, thereby greatly extending the adsorption capacity of the activated carbon, or it can be applied following the adsorption process, thereby allowing the activated carbon to be regenerated and returned for additional adsorption service.

In normal adsorption applications, activated carbon gradually accumulates chemical species removed from the liquid or vapor stream being purified, causing a progressive reduction in the carbon's ability to remove additional chemicals from the stream being treated. At some interval, i.e., when the activated carbon has become "spent", it must be replaced or regenerated to restore the adsorptive capacity. Depending on the effect of the regeneration process on the properties of the activated carbon, repeated regenerations may be possible on the same activated carbon, thereby greatly extending the useful life of the activated carbon in adsorption service.

Two methods of regeneration of spent activated carbon have found widespread industrial application: steam regeneration and thermal reactivation. In addition, there are several specialized techniques, such as solvent regeneration, chemical regeneration and super-critical fluid extraction, that have been utilized on occasion, but to a much lesser extent than the two mainstream regeneration methods.

Steam regeneration uses direct contact steam to strip the adsorbed organics away from the surface of the carbon and is routinely used for vapor-phase carbon. This technique exploits the phenomenon that the volatility of the adsorbed compounds increases with temperature. Thus, by increasing the temperature of the carbon, the equilibrium of the adsorbed chemicals can be shifted from condensed liquid in the internal pores of the carbon to the vapor phase, desorbing some of the adsorbate out of the carbon. This results in the regeneration of some of the carbon's capacity for subsequent adsorption.

Steam regeneration can successfully be utilized for volatile organic adsorbates with atmospheric boiling points up to about 120 degrees Celsius (120 C). This method has the advantage that regeneration conditions are mild and the internal pore structure of the carbon is unaffected by the regeneration conditions. Unfortunately, only portions of the available adsorption pores are steam regenerated and less volatile compounds, if present, are not effectively removed and reduce the recovered adsorptive capacity of the carbon.

Sometimes, a hot inert gas such as nitrogen is used in place of steam. Steam and hot inert gases regenerate carbon in the same manner, by heating the carbon and volatizing adsorbates directly from the surface of the internal pores of the carbon. On other occasions, the activated carbon may be heated to temperatures as high as 500 C under oxygen-depleted conditions, typically by using recycled flue gases. Under those conditions, the adsorbates decompose into gaseous fractions (such as volatile hydrocarbons, water vapor and oxides of carbon and nitrogen) and a carbonaceous residue or char, which forms within the pores of the activated carbon. Even these high temperature conditions do not appreciably deteriorate the original backbone of the activated carbon in the absence of appreciable molecular oxygen. However, depending on the adsorbates, the relative fraction of char deposited in the carbon pores will vary. The remaining char does consume recovered adsorption capacity and, in general, a slow poisoning of the carbon is observed over repeated regenerations.

Thermal reactivation involves heating the activated carbon up to temperatures above 800 degrees Celsius, restricting sources of molecular oxygen and introducing either steam or carbon dioxide as an oxidizing gas. Under those conditions, phenomena known as the "water-gas shift reactions" occur, which convert both deposited char and the graphitic backbone of the activated carbon into carbon monoxide (and hydrogen in the case of steam). The aggressive conditions of thermal reactivation effectively remove the deposited char. Unfortunately, some of the graphitic backbone of the carbon is also removed during thermal reactivation, leading to the gradual destruction of the internal pores and the eventual loss of adsorption capability and mechanical strength of the activated carbon. Furthermore, the carbon monoxide and hydrogen products of the water-gas shift reactions typically require further oxidization to form carbon dioxide and water vapor prior to release into the atmosphere.

One final regeneration method found in the prior art involves the "wet air oxidation" of spent activated carbon, where spent activated carbon is regenerated by oxidizing an aqueous solution containing a dispersion of a "carbonaceous surface adsorbent" containing adsorbed combustibles (U.S. Pat. No. 3,442,798). This technology is an example in the prior art where molecular oxygen alone is used to promote the oxidation of adsorbed organics contained within the pores of the spent activated carbon, thereby regenerating the activated carbon for reuse. Notably, the conditions provided for the wet air oxidation are such that combustibles also react directly with the molecular oxygen present in the aqueous solution. As noted in the text of this patent, column 3 lines 13–22: "A related aspect of the present invention is to use the process to obtain greater efficiency in wet air oxidizing combustibles and to wet air oxidize combustibles at lower temperatures than could be used if the oxidized combustibles were not concentrated by and adsorbed upon any surface enlarging agent. In other words, the use of a surface active adsorbent, which is not itself to be oxidized, allows the wet air oxidation of the combustibles concentrated thereon to proceed under lower temperature conditions or improved oxidation efficiencies." As such, the contribution of the surface active adsorbent is limited to concentrating the oxidizable compounds and enhancing the reaction rates by providing increased localized concentrations of combustibles, with the reactions being the same reactions that would occur in solution, although slower, in the absence of the surface active adsorbent.

Irrespective of the specific method of regeneration, all techniques for the regeneration of spent activated carbon can be evaluated in terms of the source and amount of energy required, the extent that the adsorbed compounds are removed, the fate of the desorbed compounds, and the impact of the regeneration conditions on the original activated carbon internal pore structure, adsorption capacity and mechanical integrity.

Steam regeneration utilizes the least amount of energy of any regeneration method and that energy is provided as low-pressure steam. Unfortunately, steam regeneration is effective only for low boiling materials and only regenerates the lower energy adsorption pores, recovering 20 to 50 percent of virgin activated carbon adsorption capacity. The desorbed material is generally chemically unchanged, but mixed with water vapor and must be either recovered or treated. The principal limitation is that steam regeneration does not perform acceptably for vapor phase compounds that are less volatile, and rarely works acceptably for the regeneration of spent activated carbon from liquid adsorption applications. As such, the steam regeneration method is typically limited to solvent recovery applications, where the solvent can be recovered, purified and reused, or subsequently incinerated.

The hot inert gas methods and the higher temperature flue gas techniques have a common drawback that they are heating the spent activated carbon with a gaseous steam, which requires large volumes of heated gases to supply the necessary energy to raise the temperature of the activated carbon bed. This drawback is in contrast with steam regeneration, where the heat of condensation of the steam supplies the majority of the energy necessary to raise the temperature of the activated carbon bed. The lack of condensation results in large amounts of off gases from the hot inert gas and anoxic higher temperature techniques. Since the off gases are contaminated with the desorbed compounds or the decomposition products of the previously adsorbed compounds, the entire off gas stream requires subsequent treatment to avoid unacceptable air emissions. Furthermore, depending on the properties of the adsorbed compounds, increasing amounts of low volatility adsorbed compounds and/or char may accumulate in the pore structure of the activated carbon, resulting in a progressive loss of available adsorption capacity.

Thermal reactivation is the only currently available regeneration technology that effectively addresses the problem of accumulation of non-desorbed compounds and char in the pores of the activated carbon. Unfortunately, the conditions for the water-gas shift reaction are so aggressive that the activated carbon pore structure and graphitic backbone are attacked along with the removal of the char present. Furthermore, the extremely high temperatures require the greatest amount of energy of all the regeneration approaches. In addition, the water-gas shift reactions are endothermic, meaning that they absorb energy as the reaction proceeds, with this energy being consumed at the highest temperatures.

Wet air oxidation requires that the activated carbon be contained in an aqueous suspension under sufficient pressure to maintain the liquid phase and within a temperature range of 125 C and the critical temperature of water (374 C). Unfortunately, the solubility of oxygen in water within this temperature range is very low, resulting in significant engineering challenges to get the oxygen dissolved in the aqueous dispersion so the oxygen can diffuse into the internal pores of the activated carbon and oxidize the adsorbed organics. The combination of high pressures to facilitate dissolving the oxygen and maintaining the liquid solution without vaporization result in very high equipment and operating costs for wet air oxidation and prevent it from being a cost-effective method of regenerating spent activated carbon.

SUMMARY OF THE INVENTION

Accordingly, several features of the invention are:
(a) the utilization of vapor-phase molecular oxygen or a source of gaseous molecular oxygen such as air as the reactant to oxidize the adsorbed compounds present within the pores of the activated carbon;
(b) the capability of oxidizing and removing less volatile compounds that cannot be removed by steam regeneration or other hot inert gas methods;
(c) the capability of removing char that may form within the internal pores of the activated carbon during the decomposition of adsorbed compounds;
(d) the utilization of less aggressive reaction conditions than thermal reactivation, resulting in less deterioration of the activated carbon internal pores and mechanical strength;
(e) the capability of utilizing the heat of combustion of the adsorbed compounds as a source of energy to heat the mass of activated carbon to the preferred operating temperatures, thereby reducing overall energy requirements and simplifying associated equipment;
(f) the capability of controlling the extent that the adsorbed compounds are removed;
(g) the capability of influencing the local rate of reaction by the addition of a source of liquid water or water vapor; and
(h) the capability of converting the carbon and hydrogen content of the adsorbed compounds directly into predominately carbon dioxide and water vapor, with lesser amounts of carbon monoxide.

Further objects and advantages of the invention will become apparent from consideration of the examples, figures and ensuing description.

The invention results in part from the discovery that activated carbon undergoes a slow oxidation in the presence of air at temperatures in the range of 150 C (302 F) to 375 C (707 F). The invention further results from the discovery that activated carbon held within this temperature range and provided with a source of gaseous oxygen, such as air, can be utilized for useful purposes such as the controlled oxidation of oxidizable organic vapors, the controlled oxidation of oxidizable organic liquids, and regeneration of activated carbon containing adsorbed oxidizable organic compounds.

An innovation of this invention is the use of a source of gaseous molecular oxygen, such as air, to selectively oxidize and remove the adsorbed oxidizable compounds from the internal pores of activated carbon. By this method, the heat of combustion from the oxidation of the adsorbed compounds is utilized to reduce the overall energy requirement of the regeneration process. Furthermore, the method of regeneration can be applied to any oxidizable adsorbed compound, including char that results from the decomposition of adsorbed compounds, irrespective of the volatility of said compounds.

Additional advantages relate to lower operating temperatures than thermal reactivation, which allow for the use of less expensive materials of construction, such as steel instead of refractory-lined equipment. In addition, the oxidation conditions are substantially less aggressive than thermal reactivation conditions, thus minimizing the deterioration of the activated carbon graphitic backbone. Furthermore, a source of liquid water or water vapor can be used as a means of controlling the local rate of reaction.

This invention features a method of oxidizing an organic compound that is adsorbable by activated carbon, the method comprising the steps of providing a bed of activated carbon, flowing through the bed a gas comprising a source of oxygen molecules, heating the bed to an operating temperature range whereby the molecular oxygen is oxidizing the activated carbon, as evidenced by heat generation, controlling the temperature of the bed within such temperature range, and flowing through the heated bed a stream comprising the organic compound, resulting in the adsorption and oxidation of the organic compound, and the evolution from the bed of products of the oxidation of the organic compound.

The heat generation may result in local temperature increases of at least 1 degree Celsius over local temperatures present in the absence of the source of molecular oxygen. The absence of molecular oxygen can be created under essentially equivalent operational conditions by no vapor flow or an essentially equivalent flowrate of an essentially oxygen-free vapor stream. The upper limit of the temperature range is preferably less than the ignition temperature of the activated carbon, as measured by ASTM D 3466-76: Standard Test Method for Ignition Temperature of Granular Activated Carbon. The method may further comprise adding into the heated bed a source of supplemental liquid water or water vapor to influence the oxidation reactions occurring within the bed.

The stream flowed through the bed may comprise vapors of the organic compound. The vapors of the organic compound may exhibit an equilibrium weight adsorption on the activated carbon that is at least as great as that of propane at substantially the same vapor phase concentration at substantially the same temperature. The stream may alternatively comprise a liquid comprising the organic compound. The liquid organic compound may exhibit an equilibrium vapor pressure at least as great as that of USP mineral oil within the bed operating temperature range. The liquid organic compound may exhibit an equilibrium vapor pressure not more than that of toluene within the bed operating temperature range.

This invention also features a method of oxidizing an organic compound that is adsorbable by activated carbon, the method comprising providing a bed of activated carbon containing the adsorbed organic compound, flowing through the bed a gas comprising a source of oxygen molecules, heating the bed to an operating temperature range whereby the molecular oxygen is oxidizing the activated carbon, as evidenced by heat generation, and controlling the temperature of the bed within such temperature range, resulting in the oxidation of the organic compound, and the evolution from the bed of products of the oxidation of the organic compound.

The heat generation may result in local temperature increases of at least 1 degree Celsius under the conditions previously discussed and the anticipated upper limit of the temperature range is preferably less than the ignition temperature of the activated carbon. Additionally, the impact of adding into the heated bed a source of supplemental liquid water or water vapor is as previously noted.

A liquid comprising the organic compound may be mixed into the bed, before the bed is heated. The liquid organic compound may exhibit an equilibrium vapor pressure at least as great as that of USP mineral oil within the bed operating temperature range. Alternately, the bed may be created with spent activated carbon. The spent activated carbon may be from an industrial air pollution control application. Alternatively, the spent activated carbon may be from a sugar refining application. In another alternative, the spent activated carbon may be from a corn-based sweetener production application and in yet another alternative, the spent activated carbon may be from a water supply treatment application.

BRIEF DESCRIPTION OF THE DRAWINGS

FIG. 2 is a graph of temperature vs. position in the reactor of FIG. 1 showing baseline temperature profiles with inert substrate in the reactor.

FIG. 3 is a graph of temperature vs. position in the reactor of FIG. 1 showing activated carbon temperature profiles in the reactor with and without air.

FIG. 4 is a graph of temperature vs. position in the reactor of FIG. 1 showing activated carbon temperature profiles without air, with air and with air & butane.

FIG. 5 is a graph of temperature vs. position in the reactor of FIG. 1 showing unstable activated carbon temperature profiles with air and butane.

FIG. 6 is a graph of temperature vs. position in the reactor of FIG. 1 showing activated carbon temperature profiles with butane versus propane.

FIG. 7 is a graph of temperature vs. position in the reactor of FIG. 1 showing activated carbon temperature profiles with a second activated carbon without air, with air, and with air and butane.

FIG. 8 is a graph of temperature vs. position in the reactor of FIG. 1 showing activated carbon temperature profiles during the destruction of mineral oil sprayed into the reactor.

FIG. 9 shows activated carbon adsorption properties during destruction of mineral oil sprayed into the reactor.

FIG. 10 is a graph of temperature vs. position in the reactor of FIG. 1 showing activated carbon temperature profiles during the destruction of toluene and xylene sprayed into the reactor.

FIG. 11 is a graph of temperature vs. position in the reactor of FIG. 1 showing activated carbon temperature profiles during destruction of mineral oil previously mixed with the activated carbon.

FIG. 12 is a graph of temperature vs. position in the reactor of FIG. 1 showing activated carbon temperature profiles at 250 C at the end of destruction of mineral oil previously mixed with the activated carbon.

FIG. 13 shows the activated carbon adsorption properties during destruction of mineral oil previously mixed with the activated carbon.

FIG. 14 is a graph of temperature vs. position in the reactor of FIG. 1 showing activated carbon temperature profiles during regeneration of synthetic spent activated carbon.

FIG. 15 shows synthetic spent activated carbon adsorption properties during low temperature regeneration.

FIG. 16 is a graph of temperature vs. position in the reactor of FIG. 1 showing activated carbon temperature profiles during regeneration of commercial spent activated carbon.

FIG. 17 shows commercial spent activated carbon adsorption properties during low temperature regeneration.

FIG. 18 shows sugar refining activated carbon adsorption properties as virgin activated carbon, before and after low temperature regeneration.

FIG. 19 shows the impact of supplemental steam on the low temperature regeneration of sugar refining activated carbon samples.

FIG. 20 shows corn sweetener activated carbon adsorption properties as virgin activated carbon, before and after low temperature regeneration.

FIG. 21 shows water supply treatment activated carbon adsorption properties as activated virgin carbon, before and after low temperature regeneration.

DETAILED DESCRIPTION OF THE PREFERRED EMBODIMENTS

Figure 1:
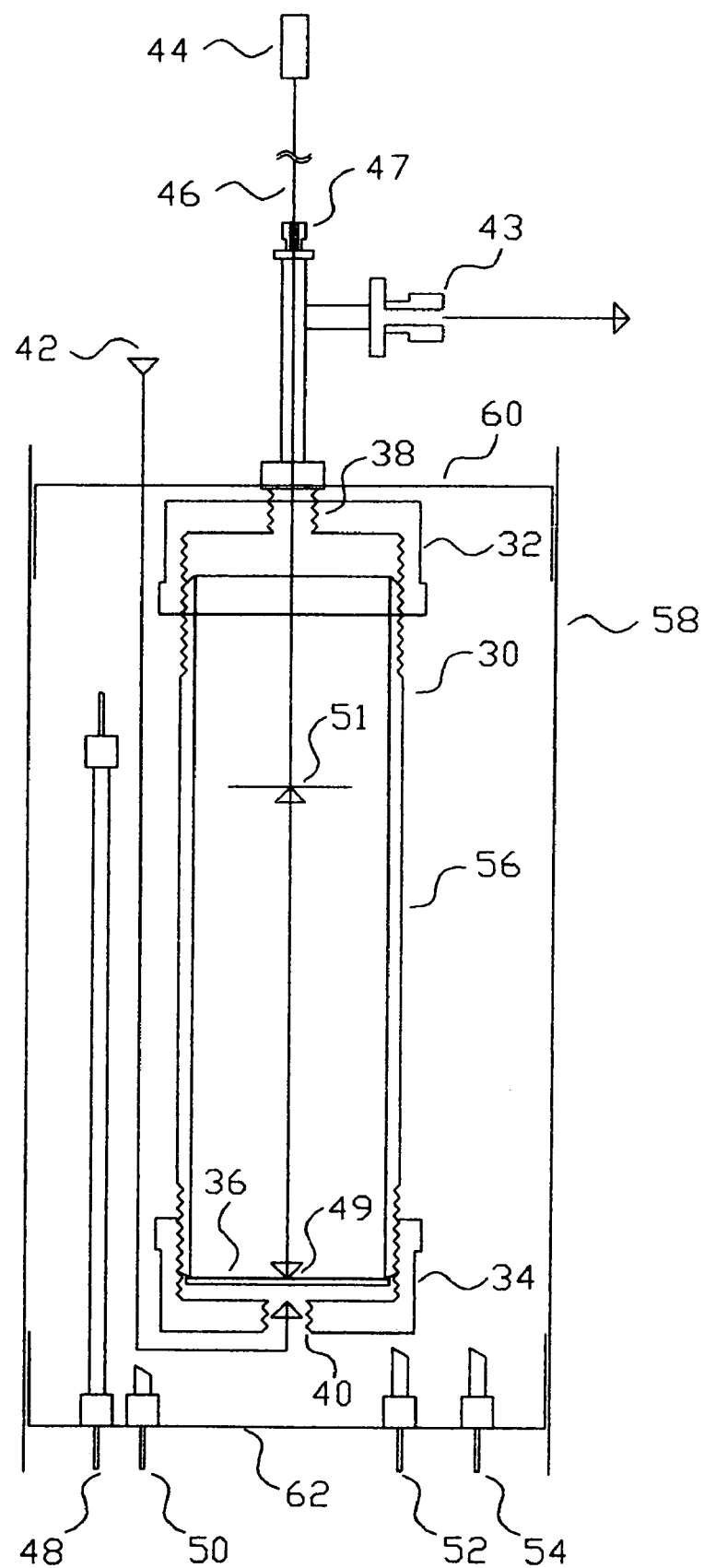
FIG. 1 is a schematic diagram of a laboratory reactor that was used to conduct the experiments detailed below.

This invention results from the discovery that slow oxidation reactions occur between activated carbon and molecular oxygen or a source of molecular oxygen such as air at a temperature range of nominally 150 C to 375 C. Within this temperature range and in the presence of a source of molecular oxygen, a number of novel and useful applications for the activated carbon have been developed and are contained in this disclosure. These applications include the oxidation of organic vapors introduced into the bed of activated carbon, the oxidation of organic liquids introduced into the bed of activated carbon, and the oxidation of previously adsorbed organic compounds accumulated on the activated carbon during previous adsorption service.

The identification and characterization of the reactions occurring between a graphitic solid surface and molecular oxygen has been previously reported in the literature, principally relating to fundamental combustion phenomena. However, the unique features of low temperature oxidation as it manifests itself in activated carbon and the applications of that phenomenon for useful purposes such as detailed in this disclosure represents a novel and useful invention.

Controlling the temperature of the activated carbon can be accomplished by balancing the rate of heat generation, due to the oxidation reactions occurring within the activated carbon, with the rate of heat removal. The rate of heat generation may be controlled by adjusting the overall temperature of the bed, which influences the rates of the individual oxidation reactions, or by regulating the supply of oxygen provided to the reacting bed, or by regulating the supply of oxidizable organics provided to the reacting bed for those applications where oxidizable organics are introduced into the bed of activated carbon as vapors or liquids in an ongoing manner. The rate of heat removal may be controlled by external heat transfer from the bed or by providing a mechanism for heat removal internal to the bed of activated carbon, such as the presence of an evaporable liquid (such as water), or by providing a flow of cooler vapor that will remove excess heat due to heating of this vapor stream. These methods of controlling the rate of heat generation and heat removal are common techniques among current industrial practice and are not delineated in the examples that follow. However, one skilled in the art will recognize that any such techniques will serve to facilitate the ongoing operation of a bed of activated carbon in the desired temperature range, and render the activated carbon capable of performing the useful oxidation reactions that are demonstrated in the examples.

The practical upper limit of the operating temperature for the activated carbon is the temperature where the activated carbon ignites in the vapor stream that it is exposed to. This upper limit may be accurately predicted by ASTM D 3466-76: Standard Test Method for Ignition Temperature of Granular Activated Carbon. ASTM D 3466-76 is intended to determine the ignition temperature in dry atmospheric air; however, the test method can be adapted to any vapor stream to determine the effects of non-ambient air levels of oxygen and moisture, in addition to the influence of impregnating agents present in the activated carbon and the presence of oxidants, such as oxides of nitrogen, in the vapor stream.

The following examples demonstrate the present invention. These features are demonstrated in a simple laboratory reactor capable of providing the necessary external heat control and metering the source of oxygen (air in all cases), and in some examples oxidizable organics, into the bed of activated carbon. The specific features of the laboratory reactor are not necessary to the performance of the invention; any such reactor, laboratory scale or larger, capable of providing similar capabilities of temperature control and metering of reactant streams to the activated carbon, will demonstrate the same phenomena and utilize the invention presented herein.

Laboratory Apparatus for the Demonstration of the Invention

Reference Numerals in FIG. 1

| | | | |
|---|---|---|---|
| 30 | reactor body | 32 | reactor end cap |
| 34 | reactor end cap | 36 | sintered metal fit |
| 38 | NPT threads | 40 | NPT threads |
| 42 | vapor stream inlet | 43 | alternate vapor inlet |
| 44 | centerline thermocouple | 46 | measurement interval |
| 47 | $1/8^{th}$ inch fitting | 48 | full length heater bar |
| 49 | bottom of reactor bed | 50 | location of heater bar |
| 51 | top of reactor bed | 52 | location of heater bar |
| 54 | location of heater bar | 56 | exterior control thermocouple |
| 58 | outer cover ductwork | 60 | outer cover end cap |
| 62 | outer cover end cap | | |

FIG. 1 shows the major components and construction details of a laboratory reactor designated R-1, used in the experiments described below. The body 30 consists of a nominally 11 inch long piece of 3 inch NPT Schedule 40 carbon steel pipe, with 3 inch NPT caps 32, 34 on each end. The bottom of the reactor 36 has a 0.10 inch thick stainless steel sintered metal frit with a nominal pore size of 100 microns, which serves to support the reactor contents and provide more uniform distribution of the entering vapor stream across the cross-section of the reactor. The end caps of the reactor are tapped with ¼ inch NPT threads 38, 40, which are adapted to dimensional tubing. A second reactor, R-2, assembled using a nominally 9 inch long piece of 1.25 inch NPT Schedule 40 carbon steel piping, was utilized for studies that benefited from improved heat removal and control due to the smaller reactor diameter and smaller mass of reacting activated carbon.

The vapor stream 42, consisting of air or a mixture of air and oxidizable organic vapors, enters the bottom of the reactor, flows axially up the bed and exits the top of the reactor, as shown in FIG. 1. Alternately, the vapor stream can be introduced at the top 43 of the reactor and flow down the reactor. The reactor can be modified to allow the addition of liquids at the top of the bed of activated carbon by inserting a tube into the top of the reactor and spraying known amounts of pressurized liquids into the heated vapor space above the bed of activated carbon. Optionally, during the addition of liquids, a vapor stream (air or nitrogen) can enter the top of the carbon bed and flow axially down the bed, exiting at the bottom of the reactor.

The top of the reactor has an adjustable centerline thermocouple 44. The thermocouple can be moved vertically to measure the centerline temperature of the reactor bed, with the principal region of interest being the bottom 7.875 inches of the bed. The thermocouple is 24 inches long and the location of the thermocouple within the reactor is determined by measuring the length in inches of exposed thermocouple shaft 46 above the $1/8^{th}$ inch fitting 47 at the top of the reactor. When the thermocouple has 7.125 inches of exposed shaft, the tip of the thermocouple, where the temperature is measured, is at the bottom 49 of the reactor bed. As the thermocouple is raised, more of the thermocouple shaft is exposed and the point of temperature measurement rises within the reactor bed. Near the top 51 of the reactor bed, the thermocouple shows approximately 15 inches of exposed shaft.

The temperature of the reactor bed is controlled by heating the air surrounding the reactor, which heats the walls of the reactor and the reactor bed by conduction. Four heater bars 48, 50, 52, 54 are located vertically around the reactor bed, as shown in FIG. 1. A thermocouple located at 56 on the exterior reactor wall is used to control the power provided to the heater bars. The temperature control is via an auto-tuning PID controller, which controls the temperature at the control thermocouple within 1 degree Celsius of the control temperature setpoint. The outer cover of the reactor consists of galvanized steel ductwork 58 and end caps 60, 62, nominally 8 inches in diameter.

The reactor configuration described above aims to provide uniform heating to all external surfaces of the reactor. As will be seen, the temperatures within the reactor are distributed narrowly and evenly around the temperature control setpoint, and variations are uniform and gradual within the reactor volume. Because the temperature used to control the power to the heater bars is measured on the wall of the reactor, heat generated within the reactor due to oxidation reactions will provide a second source of heat to the control thermocouple, and the amount of heat provided via the heater bars will be automatically reduced.

In operation, the apparatus was filled with virgin or spent activated carbon, sealed and allowed to equilibrate at a given temperature setpoint, with or without the flow of vapor through the reactor bed as indicated in the individual studies. Most of the studies using the larger reactor utilized a flow rate of air, when present, of approximately 250 milliliters per minute, and a reactor bed of approximately 1 liter, for an average empty bed contact time on the order of four minutes. Studies utilizing the smaller reactor used a flow rate of air of 150 to 200 milliliters per minute for an empty bed contact time of approximately one minute.

The temperature profile within the reactor bed was measured by moving the centerline thermocouple to the appropriate depth and allowing the temperature reading to stabilize to the nearest 0.2 degrees Celsius. All temperatures were measured with the same Type K thermocouple and thermocouple readout device, an Omega Model HH23 Digital Thermometer, which provided temperature resolution to 0.1 degrees Celsius.

Establishing the Baseline Temperature Profiles with Inert Substrate as the Reactor Bed Laboratory reactor R-1 was operated with inert substrate to calibrate the baseline temperature profiles within the reactor and demonstrate that, in the absence of activated carbon as the reactor bed contents, unexpected reactions are not present. The reactor was filled with 1530 grams of glass beads, nominally 0.55 inches in diameter, for a bed depth of approximately 8.6 inches. The temperature profiles within the reactor bed, for the range of depths shown on FIG. 1 corresponding to 7.125 to 15 inches of exposed thermocouple, were recorded after the temperature profile within the reactor had stabilized. The temperature profiles were measured at 200 C, 250 C and 300 C for the conditions of the bed without any vapor flow (i.e., no air), with air flowing at 250 ml/min, and with air and butane (at 1–3 ml/min) flowing. The results are shown in FIG. 2.

As shown in FIG. 2, the temperature profiles for the three flow regimes (no flow, airflow only, air and butane flowing together) are essentially identical for a given temperature setpoint. The overall temperature profile shows lower temperatures at the top and bottom of the reactor bed and a temperature maximum in the middle of the reactor bed. The overall temperature range is within 10 degrees Celsius across the entire reactor bed and forms a smooth gradient. This demonstrates that, in the absence of activated carbon, no appreciable exothermic reactions are occurring within the reactor bed due to the presence of air or a mixture of air and butane.

Additional studies were done with a reactor that was filled with a mixture of dry sand and carbon black to see if solid graphite would oxidize within the temperature range of concern. No significant signs of oxidation, including exotherms within the reactor and oxygen depletion in the exiting air from the reactor, were observed. Another study involved injecting a mixture of mineral spirits and mineral oil on the top of a bed of hot sand. For that study, the volatile components vaporized and immediately exited the bottom of the reactor, while the heavier boiling fractions slowly thermally degraded on the sand, eventually decomposing to yield more volatile liquids that exited the reactor and casting the sand into a monolithic mass. While this last study evidenced many chemical transformations within the reactor, none of the effects resembled the slow controllable oxidations that will be characteristic of the examples that follow.

EXAMPLE 1

Activated Carbon Temperature Profiles with and Without Air

The first phenomenon of the invention is shown in FIG. 3. Reactor R-1 was filled with approximately 1 liter of virgin granular activated carbon, nominally 4 by 10 mesh size, specific gravity of approximately 0.50 and manufactured from coconut shells. The amount of activated carbon was similar in volume to the bed of glass beads used previously. The bed was exposed to a slow flow of air (empty bed contact time of approximately 4 minutes) at atmospheric pressure. The temperatures at the same locations within the bed of activated carbon when air is present are higher than those without airflow at the same external bed temperature setpoint. These data indicate an exothermic reaction is taking place in the bed when air is slowly flushed through the bed of activated carbon. As the external temperature setpoint increases, the magnitude of the exotherm observed within the bed of activated carbon also increases. FIG. 3 shows a series of baseline temperature profiles for activated carbon with no airflow and the corresponding equilibrated temperature profile with airflow. The phenomenon is subtle at 190 C and pronounced at 270 C setpoint temperature, where the maximum exotherm attributed to the airflow approaches 30 degrees Celsius.

EXAMPLE 2

Introducing Oxidizable Organic Vapors into the Bed of Activated Carbon

The second phenomenon of the invention is shown in FIG. 4. When a representative organic vapor, butane, is passed though a bed of granular activated carbon in conjunction with air, under conditions where the activated carbon evidences the controlled exotherm shown in FIG. 3, a larger exotherm is measured relative to the previously measured exotherm attributed solely to the presence of air within the bed of activated carbon. This incremental exothermic effect is attributed to the addition of the organic vapor, butane, to the air in the vapor stream flowing through the reactor bed. The exotherm develops initially at the entrance to the reactor bed (ref. 230 C temperature profiles) and progresses to the steady-state positions shown in FIG. 4 as the equilibrium between the local rate of butane adsorption and butane oxidation is achieved over the course of several hours.

At higher set point temperatures than shown in FIG. 4, the reaction of butane with activated carbon in the presence of air was uncontrolled and did not reach a stable steady-state during the period of experimental study. These data are shown in FIG. 5 for temperature setpoints of 250 C and 270 C. When butane was added, the initial exotherm attributed to the air became highly skewed towards the entrance of the reactor bed, and the localized temperatures within the reactor bed rapidly increased. After the temperature measurements were taken at the times indicated, the exotherm was terminated by ceasing the flow of air and butane to the reactor bed.

It should be noted that any reactor design must be able to remove the additional heat generated in order for the reactor to achieve a stable temperature profile. As such, it is concluded that the practical upper working temperature of any given reactor is dictated by its ability to control the temperature of the reacting activated carbon and that upper working temperature is not necessarily indicative of the maximum upper temperature for the phenomena occurring within the activated carbon. As will be seen in later examples utilizing reactor R-2, stable reactor performance with temperature setpoints as high as 375 C have been demonstrated.

FIG. 6 shows a comparison of the contribution of butane to the exotherm within the reactor bed to the contribution of propane for identical conditions of volumetric flow rate, temperature setpoint and air flow (250 ml/min). As shown, the temperature increases associated with propane are significantly less than those observed for butane. This data indicates that characteristics of the vapor phase organic compounds influence the extent that oxidation reactions, and associated heat generation, occur within the bed of activated carbon.

FIG. 7 shows the temperature profiles for a granular activated carbon manufactured from coal, as opposed to coconut shells. The exotherms attributed to oxidation in air are shown for three temperature set points (210 C, 250 C and 290 C), as well as the butane and air exotherm at 250 C. Comparison of the temperature profiles for this coal-based activated carbon with the previous results for coconut shell-based activated carbon indicates that the trends are qualitatively similar, but quantitatively different. It is concluded that the coal-based activated carbon exhibits air oxidation and butane oxidation at higher temperatures and to a lesser extent than the coconut shell activated carbon. This data indicates that characteristics of the activated carbon, in this case starting material, influence the extent to which oxidation reactions occur within the activated carbon bed.

EXAMPLE 3

Introducing Oxidizable Organic Liquids into the Bed of Activated Carbon

As a demonstration of an additional method to destroy a representative organic liquid, USP Mineral Oil, reactor R-1 was reconfigured to allow the addition of the organic liquid at the top of the bed of activated carbon. In this configuration, the vapor stream (air or nitrogen) enters the top of the carbon bed and flows axially down the bed, exiting at the bottom of the reactor. USP Mineral Oil is a mixture of paraffinic and naphthenic hydrocarbons with an average molecular weight of 375 to 480 amu and an atmospheric boiling point above 300 C.

Reactor R-1 was loaded with approximately 500 grams of dry virgin coconut-based activated carbon. The reactor was allowed to stabilize at an external temperature setpoint of 225 C. Baseline temperature profiles were measured in the reactor for the conditions of no flow and airflow at 250 ml/min.

A series of additions of mineral oil were made with air flowing at 250 ml/min at all times and the external temperature setpoint of 225 C. Each addition was between 10 to 12 grams of USP mineral oil, which was sprayed on the top of the carbon bed. The temperature profiles within the carbon bed were recorded after 0.5, 2.5, 6 and 10 hours, as shown in FIG. 8. As can be seen, the first mineral oil addition produced an exotherm that traveled down the bed (in the direction of the air flow) and gradually dissipated over the course of 10 hours. Each subsequent mineral oil addition reverted to approximately the original temperature profile after 10 hours.

After the fourth mineral oil addition, the reactor was disassembled and the carbon mixed and sampled. The remaining carbon was returned to the reactor, airflow initiated at 250 ml/min and the external temperature setpoint was raised to 275 C for a period of 6.5 hours. This additional heating in the presence of airflow was intended to destroy any residual mineral oil remaining on the activated carbon. At the end of 6.5 hours, the final temperature profile in airflow shown in FIG. 8 was recorded. The vapor flow was switched to nitrogen and the reference temperature profile with nitrogen flow at 275 C was recorded, also shown in FIG. 8.

In order to evaluate the impact of the destruction of the mineral oil on the activated carbon, samples taken during and after the Example 3 studies were compared to virgin activated carbon samples. Activated carbon is a relatively difficult material to assay for adsorption characteristics because the extent of adsorption depends on many factors, not the least of which are the types and concentrations of adsorbates present on the carbon, the original starting material for the activated carbon and the dryness of the carbon.

Historically, activated carbon has been characterized by a number of ASTM tests, with the results of those tests correlating to performance in adsorption applications. One such ASTM test is ASTM D 5228: Determination of the Butane Working Capacity (BWC) of Activated Carbon. As noted in the Significance and Use section of ASTM Designation: D 5228-92: "The BWC can also provide a relative measure of the effectiveness of the tested activated carbons on other adsorbates."

ASTM D 5228 first measures Butane Activity, which is the weight gain of a sample of activated carbon when equilibrated in a stream of pure butane vapor under controlled conditions. Then the test measures the Butane Retentivity, which is the residual butane retention after purging the carbon for 40 minutes with 1000 bed volumes of dry air. The Working Capacity is defined as the Activity less the Retentivity, typically expressed as weight of adsorbate per unit weight carbon. Activity measures the total of pores above the minimum adsorption energy required to retain the hydrocarbon test gas, and Retentivity measures the fraction of pores with a higher adsorption energy. In general, higher Activity and Retentivity measurements correspond to improved adsorption performance by activated carbon in actual adsorption applications.

In order to characterize the available adsorption capacity on the activated carbon, the ASTM D 5228 test can be performed using either butane or propane, yielding up to four measures of the adsorption capacity of the activated carbon for four different adsorption conditions. Propane is less favorably adsorbed on activated carbon as compared to butane. As will be seen, for a given carbon sample, a descending trend exists of butane activity>propane activity>butane retentivity>propane retentivity.

FIG. 9 shows the butane and propane activity and retentivity measurements for several samples of dried virgin activated carbon, as well as the assay for the carbon sample taken after the 225 C destruction of mineral oil and after the additional treatment at 275 C.

The three samples of dried virgin activated carbon consisted of the same lot of activated carbon, dried under essentially the same conditions, but on three separate occasions. The variability of the three samples demonstrates the difficulty in repeatedly conditioning and measuring the adsorption characteristics of activated carbon. Irrespective of the variations in the assays of the virgin carbons, it is apparent that the carbon after destruction of mineral oil at 225 C had lost measurable adsorptive capacity and a significant fraction of the lost capacity was regained during subsequent treatment at 275 C.

An additional demonstration of the destruction of organic liquids in reactor R-1 was performed using toluene and xylene as representative organic compounds. These liquids were chosen because they have boiling points below the temperature of the bed of activated carbon that they were sprayed onto. This allows the investigation of the behavior of flashing liquids and whether flashing liquids would pass as vapor through the bed of activated carbon without destruction.

Prior to the toluene and xylene additions, the reactor exit was fitted with a heat exchanger to cool the exiting vapors and a trap containing 70 grams of coconut-based activated carbon. Any flashing organic vapors exiting the reactor would be cooled and adsorbed in the activated carbon trap. The activated carbon in the trap could be assayed to determine the approximate portion of the organic vapors that escaped during organic liquid addition or that were stripped without destruction during subsequent treatment.

The reactor was filled with approximately 1 liter of wood-based granular activated carbon weighing about 325 grams. The lower carbon weight was due to the lower density of wood-based carbons as compared to coconut-based carbons, resulting in less weight of carbon for a given reactor volume. This carbon was chosen to demonstrate that the treatment could be performed with activated carbons other than coconut-based or coal-based carbons.

The reactor was stabilized at 200 C and purged with nitrogen prior to the toluene addition. The flow of nitrogen purge gas halted just prior to toluene addition. Upon addition of 11 grams of toluene, there was a marked cooling of the centerline temperature profile within the reactor, but no pronounced release of vapors from the reactor exit after the trap. After the reactor temperature stabilized, airflow was initiated at 250 ml/min.

The temperature profiles at 200 C are shown in FIG. 10. Very little effect was observed on the reactor temperature profile, as shown at the bottom of FIG. 10. This is in contrast with previous studies, where the onset of airflow initiated a pronounced exotherm that traveled through the reactor bed in the direction of the airflow.

In light of the absence of exotherm, the reactor temperature setpoint was increased to 250 C. The increased temperature setpoint initiated an exotherm that traveled down the reactor in the direction of the airflow. After one hour the maximum temperature at 13 inches is shown in FIG. 10 as a single data point, in addition to the temperature profile after two hours at 250 C. The activated carbon in the post-heat exchanger carbon trap was changed and the carbon retained for assay.

The reactor was purged with nitrogen; the flow of purge gas halted and 11 grams of xylene was injected one hour after the last toluene temperature profile at a temperature setpoint of 250 C. The reactor bed temperature profiles were taken after 1 hour and 2 hours after the xylene addition, as shown in FIG. 10. The same characteristic traveling exotherm is observed with the xylene addition.

The granular activated carbon from the post-heat exchanger carbon trap for both the toluene and xylene runs was inspected and found to have gained weight, had the appearance of surface moisture, but lacked any characteristic organic odor. Upon drying in nitrogen at 150 C, the trap carbon was determined to have essentially the same adsorption characteristics as the original virgin activated carbon. In light of the lack of odor by the wet trap carbon and subsequent evaluation of the adsorption characteristics, it was concluded that an insignificant amount of organic compounds were stripped from the reactor by the airflow during the destruction of the flashing organic liquids.

EXAMPLE 4

Behavior of Oxidizable Organic Liquids Previously Mixed into the Bed of Activated Carbon An alternate method of destroying organic liquids is provided by this invention. In this application, the organic liquid is mixed with activated carbon, and then subsequently the mixture is subjected to elevated temperatures and airflow to affect the destruction of the organic liquids. Coconut-based granular activated carbon was mixed with 10% by weight of USP mineral oil. USP mineral oil is a clear viscous oily liquid at room temperature. The mineral oil/activated carbon mixture was allowed to sit for several hours, during which the oily coating of mineral oil appeared to soak into the granular activated carbon.

Reactor R-1 was loaded with 540 grams of the mineral oil/carbon mixture and conditioned for 9 hours by flowing nitrogen at 200–250 ml/min while heating the reactor to 250 C. The reactor was disassembled, the carbon mixed and sampled. The reactor was reloaded with 490 grams of the conditioned mineral oil/carbon, sealed and preheated to 200 C with no nitrogen or airflow. The temperature profile with no flow within the reactor was taken. Nitrogen gas flow was started and the temperature profile within the reactor recorded, as shown in FIG. 11.

Subsequently, airflow was initiated at 250 ml/min while holding the external temperature of the reactor at 200 C. FIG. 11 shows the temperature profile within the reactor at 3, 13, 26 and 36 hours. As seen in FIG. 11, a pronounced exotherm is observed traveling in the direction of the airflow. The exotherm is significantly in excess of the exotherm measured in the presence of airflow through activated carbon alone, and this is attributed to the destruction of the mineral oil present on the activated carbon. By 36 hours, the exotherm exits the reactor and the reactor returns to the temperature profile associated with just airflow through the bed of virgin activated carbon. The external temperature of the reactor was then raised to 250 C for an additional 20 hours and the final temperature profile recorded.

FIG. 12 shows the temperature profile recorded after 56 hours, as provided in FIG. 11, as well as additional temperature profiles for the bed of virgin activated carbon under the conditions of no flow, nitrogen flow and airflow. As can be seen, the final temperature profile after 56 hours closely matches the temperature profile under airflow conditions observed in a bed of virgin activated carbon without any mineral oil addition.

The results of FIG. 11 demonstrate that the mineral oil is causing a pronounced exotherm in the presence of air within the carbon bed, which is attributed to the mineral oil undergoing oxidative reactions that destroy the mineral oil. The results of FIG. 12 demonstrate that the activated carbon returns to the original temperature profile associated with virgin activated carbon after sufficient time has passed at an elevated temperature.

FIG. 13 shows a comparison of the propane and butane adsorption capacity of activated carbon before any mineral oil addition, after the mixing and ambient temperature equilibration with mineral oil, after conditioning at 250 C in flowing nitrogen and after the destruction of the mineral oil after 56 hours of airflow. For each activated carbon, the butane and propane activity and retentivity was measured.

FIG. 13 shows that the addition of the mineral oil to the virgin activated carbon reduced all the adsorption capacity measures significantly and that the measures remained reduced after the conditioning of the activated carbon at 250 C with a nitrogen sweep. After 56 hours under conditions that produce the oxidative destruction of the mineral oil, the activated carbon regained most of the original adsorption capacity. The lost adsorption capacity of the post-treatment carbon, as compared to the virgin activated carbon, is attributed to residual mineral oil and degradation products remaining in the pore structure of the activated carbon. These residual adsorbates apparently do not prevent the continued reaction of the activated carbon with air at elevated temperatures, as shown in FIG. 12.

EXAMPLE 5

Temperature Profiles During Regeneration of Synthetic Spent Activated Carbon

It is apparent from the data contained in FIG. 13 that the addition of organic compounds to the activated carbon reduced the remaining available adsorption capacity, as measured by ASTM D 5228 using either Butane or Propane. Subsequent thermal treatment under nitrogen sweep restored a small portion of the activated carbon adsorption capacity and additional treatment under oxidizing conditions restored significantly more adsorption capacity relative to the original starting material. This observation suggests that the methods of this invention may be utilized to regenerate spent activated carbon, which is activated carbon that has been utilized in commercial adsorption applications and has been removed from the adsorption service with a portion of the virgin activated carbon adsorption capacity consumed or "spent".

As a demonstration of the regeneration of spent activated carbon, a sample of coconut-based dry virgin activated carbon was mixed with a mixture of commercial mineral spirits (Stoddard Solvent CAS: 8052-41-3) and USP Mineral Oil. Stoddard Solvent is a common refinery cut that is a mixture of 85% nonane and 15% trimethylbenzene. Equal weights of the mineral spirits and mineral oil, constituting a broad range of molecular weights from 120 to above 500 amu, was added to the activated carbon. The total loading of additional organics was 23 weight percent of the weight of the virgin activated carbon. The mixture was heated to 125 C for a period of 9 hours with periodic mixing to facilitate the adsorption of the organics by the internal pores of the activated carbon. The heat-stabilized mixture of synthetic spent activated carbon was tested for adsorption capacity and 635 grams loaded into reactor R-1.

FIG. 14 shows the temperature profiles in the lab reactor at 200 C. Initial profiles were taken for the case of no flow and flow of nitrogen through the reactor. Upon providing the air to the reactor, the low temperature oxidation phenomenon was observed as an exotherm progressing up the reactor in the direction of the airflow. As can be seen, the exotherm progresses slowly and uniformly up the reactor over the course of several days, with the final temperature profile after 72 hours approaching the interpolated temperature profile for coconut-based activated carbon in air at 200 C, based on the data shown in FIG. 3.

FIG. 15 shows a comparison of the propane adsorption capacity of the starting dry activated carbon, after the 125 C conditioning with the mineral spirits/mineral oil blend, and after the regeneration of the synthetic spent activated carbon under oxidative conditions at sequentially 200 C, 250 C and 275 C. As can be seen in FIG. 15, significant adsorption capacity was lost due to the addition of the organic compounds to the activated carbon and a significant fraction of the lost adsorption capacity was restored by the subsequent low temperature regeneration of the synthetic spent activated carbon. In addition, incremental regeneration of the synthetic spent activated carbon capacity is observed at each sequentially higher regeneration temperature.

EXAMPLE 6

Temperature Profiles During Regeneration of Industrial APC Spent Activated Carbon As a further demonstration of the regeneration of spent activated carbon, a sample of an industrial APC (Air Pollution Control) spent activated carbon was obtained. The sample was a pelletized activated carbon used to control the air emissions from a polymer compounding facility and was heavily loaded with a broad range of organic compounds. In addition, the carbon had previously been thermally regenerated several times after being loaded by the same abatement application. Overall, the carbon showed evidence of considerable physical deterioration, as evidenced by broken edges and non-uniform particle size. As such, and due to the previous thermal regenerations, the adsorption characteristics of the industrial APC activated carbon are difficult to estimate, but the adsorption capacities are anticipated to be diminished relative to virgin activated carbon.

Approximately 670 grams of this industrial APC spent activated carbon was loaded into reactor R-1 and heated to 200 C. FIG. 16 shows the temperature profiles in the lab reactor at 200 C at the times indicated. The oxidation phenomenon was observed as an exotherm progressing in the direction of the airflow. As can be seen, the exotherm appears to have many of the same features previously observed with the synthetic spent activated carbon, as shown in FIG. 14. After 30 hours, the final temperature profile approaches the interpolated temperature profile for coconut-based activated carbon in air at 200 C.

FIG. 17 shows a comparison of the butane adsorption capacity of the starting industrial APC spent activated carbon, the same carbon after drying at 100 C under a nitrogen sweep, and after the regeneration of the industrial APC spent activated carbon under low temperature oxidation conditions at sequentially 200 C, 250 C and 300 C. As can be seen in FIG. 17, the original spent activated carbon evidenced extremely low residual adsorption capacity and only a minor amount of adsorption capacity was recovered by drying the spent carbon. In contrast, a significant fraction of the lost adsorption capacity was restored by the oxidative regeneration of the industrial APC spent activated carbon. In addition, as observed with the synthetic spent activated carbon, incremental regeneration of the industrial APC spent activated carbon capacity is observed at each sequentially higher regeneration temperature.

EXAMPLE 7

Regeneration of Sugar Refining Spent Activated Carbons

As a further demonstration of the regeneration of spent activated carbon, two samples of commercial sugar refining spent activated carbon were obtained. Both samples were granular activated carbon used to decolorize raw sugar during refining into white sugar. Sugar refining spent activated carbon is loaded with a broad range of organic compounds, often consisting of polymers of smaller naturally occurring compounds that polymerize under sugar refining conditions. The 12$^{th}$ edition of the Cane Sugar Handbook (Ed. Chen and Chou, John Wiley & Sons, Inc. 1993) identifies four classes of colorants: phenolics, melanoidins (condensation polymers of sugars and proteins), caramels (condensation polymers of sugars alone) and invert degradation products. One of the standard industrial practices for decolorizing sugar solutions is filtration through beds of granular activated carbon, which is exhausted at a rate equal to about one percent of the finished dry sugar production rate. The exhausted or spent activated carbon is thermally reactivated within the sugar refining operations and reused until the particle size becomes unacceptably small.

Two samples of sugar refining spent activated carbon were obtained, along with samples of the same spent material after onsite high temperature thermal reactivation. Each spent carbon was regenerated in reactor R-2 with airflow of approximately 200 ml/minute. Each sample of spent carbon was first dried at 150 C. Over the next eight to twelve hours, the temperature was increased in a series of steps of 25 to 100 degrees Celsius to a temperature setpoint of 350 C. The temperature at the center of reactor R-2 was monitored, in addition to the percentage of carbon dioxide and carbon monoxide in the reactor vapor effluent. Each temperature setpoint increase was characterized by an exotherm at the center of the reactor and a sharp increase in the effluent levels of carbon dioxide and, to a lesser extent, carbon monoxide. After an hour or more, the exotherm receded and the carbon oxide vapors in the reactor effluent decreased, at which time the temperature setpoint of the reactor was increased.

The sugar refining activated carbons studies consisted of two regenerations of the first commercial sample and one regeneration of the second. After low temperature regeneration, the sugar refining activated carbon samples were tested for adsorption capacity using the Propane Working Capacity test previously described (ASTM D5228 with propane as the test gas). The results are shown on FIG. 18 for the propane retentivity and propane working capacity of the sugar refining samples (Note: propane activity equals the sum of the propane retentivity and the propane working capacity). FIG. 18 shows the results for virgin sugar refining activated carbons, dried spent activated carbon samples, the onsite reactivated carbon samples (denoted React Sugar#) and the samples regenerated using the low temperature technique (denoted Regen Sugar#). FIG. 18 also shows the effect of additional regeneration in reactor R-2 of one sample of thermally reactivated activated carbon (React+Regen Sugar1). This carbon was treated for 6.5 hours at 350 C, which appears to have provided beneficial additional regeneration over the previous onsite thermal reactivation.

Additional studies were performed to investigate the effect of supplemental steam on the low temperature oxidation reactions. These studies were performed by repeating the time-temperature history of the previous regeneration performed on reactivated and spent GAC identified as Sugar1 in FIG. 18. The regenerations were performed in reactor R-2, containing between 80 and 85 grams of activated carbon. During the regeneration five or six aliquots of 10 milliliters of liquid water were injected at the top of the bed of hot activated carbon, with air flowing down into the bed of activated carbon. At the temperatures inside the reactor, the liquid water would immediately vaporize and the resulting steam would be swept by the air stream through the bed of activated carbon.

Due to the heat required to vaporize the liquid water, the temperature at the center of the reactor initially dropped several degrees Celsius after the introduction of the water aliquot. Subsequently, the center temperature exhibited a pronounced exotherm lasting approximately 30 minutes, accompanied by elevated levels of carbon dioxide and carbon monoxide in the reactor effluent. The exotherm ranged from up to 20 degrees Celsius for the reactivated Sugar1 carbon to up to 45 degrees for the spent Sugar1 carbon. In general, the higher the reactor temperature, the more pronounced the resulting exotherm.

FIG. 19 shows the propane retentivity and propane working capacity of the sugar refining samples regenerated with supplemental steam. The reactivated Sugar1 sample, which had been reactivated by the high temperature reactivation process at the sugar manufacturing facility, showed a comparable increase in adsorption capacity when subjected to the low temperature regeneration treatment with and without supplemental steam. In contrast, the spent Sugar1 sample showed an improvement in adsorption capacity when regenerated with supplemental steam as compared to the low temperature regeneration treatment without supplemental steam.

It is apparent from FIGS. 18 and 19 that the low temperature regeneration method was effective in restoring the adsorption capacity in sugar refining spent activated carbons, as measured by the ASTM D-5228 assay using propane as the test gas. The impact of supplemental steam is apparent from the resulting temperature increases within the reactor and the increased carbon oxide vapor levels in the reactor effluent. In addition, supplemental steaming appears to have beneficial impact on the adsorption capacity of the regenerated carbon in some cases.

EXAMPLE 8

Regeneration of Corn Sweetener Spent Activated Carbon

As a further demonstration of the regeneration of spent activated carbon, two samples of commercial corn sweetener spent activated carbon were obtained. Both samples were granular activated carbon used to treat corn syrups during the production of corn-based sweeteners. Corn sweetener spent activated carbon is loaded with a broad range of organic compounds that, unless removed, could contribute undesired odor, color or taste to the finished product.

One of the standard industrial practices for removing undesired organic impurities from corn syrups is filtration through beds of granular activated carbon, which is exhausted at a rate equal to about one percent of the corn sweetener production rate. The exhausted or spent activated carbon is thermally reactivated within the corn sweetener refining operations and reused until the particle size becomes unacceptably small.

Two samples of corn sweetener spent activated carbon were obtained, along with samples of the same spent material after onsite thermal reactivation. Each spent carbon was regenerated in reactor R-2 with airflow of approximately 200 ml/minute over a period of eight to ten hours.

The same methodology was used for monitoring the oxidation reaction as the sugar refining activated carbon samples, except one sample, Regen2 Corn 1 featured a final control temperature setpoint of 375 C for three hours. The corn sweetener spent activated carbons behaved qualitatively the same during low temperature regeneration as the sugar refining spent activated carbons.

The regenerated corn sweetener activated carbons were tested for adsorption capacity using the Propane Working Capacity test. The results are shown on FIG. 20 for the propane retentivity and propane working capacity of virgin corn sweetener activated carbons, dried spent activated carbon samples, the reactivated carbon samples and the samples regenerated using the low temperature technique. It is apparent from FIG. 20 that the low temperature regeneration method was effective in restoring the adsorption capacity in corn sweetener spent activated carbons, as measured by the ASTM D-5228 assay using propane as the test gas.

EXAMPLE 9

Regeneration of Water Supply Treatment Spent Activated Carbon

As a further demonstration of the regeneration of spent activated carbon, two samples of water supply treatment spent activated carbon were obtained. Both samples were granular activated carbon used to treat potable water being drawn from surface water supplies. Surface water sources, such as lakes and rivers, are loaded with a broad range of naturally occurring organic compounds that, unless removed, could contribute undesired taste and odor to the potable water.

One of the standard industrial practices for removing naturally occurring organic compounds from drinking water supplies is filtration through beds of granular activated carbon, where the activated carbon often remains in service for one to three years. The exhausted or spent activated carbon is either thermally reactivated or replaced, depending on the practice of the local water treatment facility.

Two samples of water supply treatment spent activated carbon were obtained, along with one sample of one spent material after onsite thermal reactivation. Each spent carbon was regenerated in reactor R-2 with airflow of approximately 200 ml/minute over a period of six to sixteen hours. The same methodology was used for monitoring the oxidation reaction as the sugar refining activated carbon samples. The water supply treatment spent activated carbons behaved qualitatively the same as the sugar refining spent activated carbons.

One sample of spent activated carbon (Regen1 Water1) was low temperature regenerated over 16 hours over a temperature range of 150 C to 300 C, then assayed for propane working capacity. The sample Regen1 Water1 was returned to reactor R-2 and regenerated for an additional six hours to a control temperature setpoint of 350 C for the final 3 hours. Sample Regen Water2 was regenerated over a temperature range of 150 C to 300 C over 8 hours.

The regenerated water supply treatment activated carbons were tested for adsorption capacity using the Propane Working Capacity test previously. The results are shown on FIG. 21 for the propane retentivity and propane working capacity of virgin water supply treatment activated carbon, dried spent activated carbon samples, the reactivated carbon sample for Water1 and the samples regenerated using the low temperature technique. It is apparent from FIG. 21 that the low temperature regeneration method was effective in restoring a significant portion of the adsorption capacity in water supply treatment spent activated carbons, as measured by the ASTM D-5228 assay using propane as the test gas. It is notable that sample Regen2 Water1 demonstrated incremental improvement associated with the second low temperature regeneration treatment.

Conclusions, Ramifications and Scope

Four phenomena are demonstrated in this disclosure: the slow controllable oxidation of activated carbon in air at elevated temperatures, the co-oxidation of organic vapors when passed through a bed of activated carbon undergoing the slow controllable oxidation, the co-oxidation of organic liquids when present within a bed of activated carbon undergoing the slow controllable oxidation, and the regeneration of the adsorption capacity of spent activated carbon by the application of the same conditions of slow controllable oxidation. It is postulated that these phenomena are due to the large and tightly packed internal surface area of the activated carbon, which results in slow surface oxidation reactions proceeding at a measurable rate. It is further postulated that the internal adsorption pores are facilitating the oxidation of the organics by concentrating the organics in the internal pores, resulting in reaction with oxygen present on the activated carbon surface.

The postulated explanation for the co-oxidation of organic vapors is that the organic vapors are not remaining in the vapor phase during transit through the reacting activated carbon bed, but rather are repeatedly adsorbing and desorbing from the surface of the activated carbon in a chromatographic manner as they move through the bed. In the course of adsorbing and desorbing, the organic vapors are reacting with the oxidizing regions associated with the internal surface area of the activated carbon. These oxidation reactions are exothermic and thus increase the bed temperature, as observed.

The postulated explanation for the co-oxidation of organic liquids present in the bed of activated carbon is that the organic liquids are not remaining tightly adsorbed, but are becoming involved in the surface oxidation reactions occurring within the activated carbon. The organic liquids can be viewed as being resident in the internal pore structure of the activated carbon, but oscillating between the vapor phase and the adsorbed state within the activated carbon bed. In the course of adsorbing and desorbing, the organics are reacting with the oxidizing regions associated with the internal surface area of the activated carbon. These oxidation reactions are exothermic and thus increase the bed temperature, as observed.

The postulated explanation for the regeneration of the adsorption capacity of spent activated carbon is that the previously adsorbed compounds are composed in part of organic compounds, which are present within the internal pores of the activated carbon. As such, the organic component is behaving in the manner of the organic vapors and liquids discussed above. The resulting oxidation of the organic compounds results in removal of that portion of the previously adsorbed compounds from the internal surface of the spent activated carbon, which restores a portion of the original virgin activated carbon adsorption capacity.

The postulated explanation for the effect of liquid water and water vapor on the low temperature regeneration process is that the water liquid is evaporating, thereby adsorbing heat from the surrounding activated carbon, and the water vapor is subsequently chromatographically adsorbing and desorbing as it passes through the remaining bed of activated carbon. During the adsorption of water vapor within the pores of the activated carbon, the heat of adsorption is released locally within the carbon pore, thereby locally increasing the rates of ongoing oxidation reactions.

The overall conclusion is that low temperature oxidation has widespread versatility for the destruction of organic vapors and liquids by activated carbon and applications for the regeneration of spent activated carbons containing previously adsorbed organic compounds. The specific behavior of an individual application depends on many factors, including the temperature, airflow, heat removal capabilities of the reactor, adsorption history of the activated carbon, and properties of the organic compounds being oxidized.

The ramifications are that the entire spectrum of oxidizable organic compounds that can be adsorbed on activated carbon can be oxidized in a controllable manner that has not previously been disclosed. As such, it represents an alternative and unique oxidation option for organic compounds, fundamentally and functionally different from high temperature oxidation and combustion processes, metal-catalyzed oxidation processes, biologically facilitated oxidations and other possible chemical transformations not involving activated carbon. In this manner, many of the current applications for combustion and oxidation of organic compounds, including the generation of thermal energy and the destruction of the undesirable organic compounds, may be accomplished by low temperature oxidation using activated carbon.

Because low temperature oxidation using activated carbon operates at lower temperatures than high temperature thermal oxidation and many catalytic oxidations, the materials of equipment construction may be significantly less expensive. Furthermore, the reaction rate and extent can be dictated by controlling the temperature of the reaction, controlling the amount of oxygen available or controlling the amount of oxidizable organics present on the activated carbon.

While the above description and examples contain many specificities, these should not be construed as limitations on the scope of the invention, but rather as an exemplification of one of the preferred embodiment thereof. Many other variations are possible, generally resulting from the application of accepted engineering principles to specific requirements of the application. For example, spent radioactive waste containing organic compounds could be treated with activated carbon, thereby transferring some of the radioactive compounds to the activated carbon. Upon low temperature oxidation, the organic compounds would be decomposed and the non-volatile radioactive compounds would remain with the activated carbon. The regenerated activated carbon could be used for additional adsorption service or reduced to ash under appropriate conditions.

Accordingly, the scope of the invention should be determined not by the embodiments illustrated, but by the appended claims and their legal equivalents.

What is claimed is:

1. A method of oxidizing an organic compound that is adsorbable by granular or pelletized activated carbon, the method comprising:
   providing a bed of granular or pelletized activated carbon produced from coal, wood or coconut-derived raw material, the activated carbon containing an adsorbed organic compound;
   flowing through the bed a gas comprising a source of oxygen molecules;
   heating the bed to an operating temperature range whereby the oxygen molecules are oxidizing the activated carbon at a slow, controlled rate, as evidenced by detectable but moderate heat generation without carbon combustion; and
   controlling the temperature of the bed within such operating temperature range, resulting in the co-oxidation of the organic compound, and the evolution from the bed of products of the oxidation of the organic compound.

2. The method of claim 1 wherein the heat generation results in a temperature increase in the bed of at least 1 degree Celsius as compared to the bed temperature in the absence of a source of oxygen molecules, as created under essentially equivalent operational conditions by no gas flow through the bed, or an essentially equivalent flowrate through the bed of an essentially oxygen-free gas stream.

3. The method of claim 1 wherein the upper limit of the operating temperature range is less than the ignition temperature of the activated carbon, as measured by ASTM D 3466-76: Standard Test Method for Ignition Temperature of Granular Activated Carbon.

4. The method of claim 1 wherein the operating temperature range is from about 150° C. to about 375° C.

5. The method of claim 1, further comprising adding into the heated bed a source of supplemental liquid water or water vapor, to influence the oxidation reactions occurring within the bed.

6. The method of claim 1 wherein the providing step comprises mixing a liquid comprising the organic compound into the bed, before the bed is heated.

7. The method of claim 6 wherein the liquid comprising the organic compound exhibits an equilibrium vapor pressure at least as great as that of USP mineral oil within the bed operating temperature range.

8. The method of claim 6 wherein the operating temperature range is from about 200° C. to about 250° C.

9. The method of claim 1 wherein the providing step comprises creating the bed with spent granular or pelletized activated carbon.

10. The method of claim 9 wherein the spent granular or pelletized activated carbon is from an industrial air pollution control application.

11. The method of claim 10 wherein the operating temperature range is from about 200° C. to about 300° C.

12. The method of claim 9 wherein the spent granular or pelletized activated carbon is from a sugar refining application.

13. The method of claim 12, further comprising adding into the heated bed a source of supplemental liquid water or water vapor, to influence the oxidation reactions occurring within the bed.

14. The method of claim 12 wherein the operating temperature range is from about 150° C. to about 350° C.

15. The method of claim 9 wherein the spent granular or pelletized activated carbon is from a corn-based sweetener production application.

16. The method of claim 15 wherein the operating temperature range is from about 150° C. to about 375° C.

17. The method of claim 9 wherein the spent granular or pelletized activated carbon is from a water supply treatment application.

18. The method of claim 17 wherein the operating temperature range is from about 150° C. to about 350° C.

* * * * *